(12) United States Patent
McWilliams et al.

(10) Patent No.: US 11,954,732 B2
(45) Date of Patent: Apr. 9, 2024

(54) RULES ENGINE AND METHOD FOR EVALUATING A PLURALITY OF CRYPTOCURRENCIES

(71) Applicant: MoneyGram International, Inc., Minneapolis, MN (US)

(72) Inventors: John McWilliams, Dallas, TX (US); Andrew Soong, Dallas, TX (US); James Johnson, Dallas, TX (US)

(73) Assignee: MoneyGram International, Inc., Dallas, TX (US)

( * ) Notice: Subject to any disclaimer, the term of this patent is extended or adjusted under 35 U.S.C. 154(b) by 10 days.

(21) Appl. No.: 17/473,491

(22) Filed: Sep. 13, 2021

(65) Prior Publication Data

US 2022/0129981 A1   Apr. 28, 2022

Related U.S. Application Data

(63) Continuation of application No. 15/953,282, filed on Apr. 13, 2018, now abandoned.

(51) Int. Cl.
| | |
|---|---|
| *G06Q 40/04* | (2012.01) |
| *G06F 16/951* | (2019.01) |
| *G06Q 20/06* | (2012.01) |
| *G06Q 20/36* | (2012.01) |
| *G06Q 20/40* | (2012.01) |
| *G06Q 30/018* | (2023.01) |

(52) U.S. Cl.
CPC ........... *G06Q 40/04* (2013.01); *G06F 16/951* (2019.01); *G06Q 20/0655* (2013.01); *G06Q 20/3678* (2013.01); *G06Q 20/405* (2013.01); *G06Q 30/018* (2013.01); *G06Q 2220/00* (2013.01)

(58) Field of Classification Search
CPC ............... G06Q 40/04; G06Q 20/0655; G06Q 20/3678; G06Q 20/405; G06F 16/951
See application file for complete search history.

(56) References Cited

U.S. PATENT DOCUMENTS

| | | | |
|---|---|---|---|
| 8,204,809 B1 | 6/2012 | Wise | |
| 9,836,790 B2 | 12/2017 | Ronca et al. | |
| 9,892,460 B1 | 2/2018 | Winklevoss et al. | |
| 2001/0034678 A1 | 10/2001 | Lerner et al. | |
| 2005/0177499 A1 | 8/2005 | Thomas | |
| 2008/0059370 A1 | 3/2008 | Sada et al. | |
| 2008/0162224 A1 | 7/2008 | Coon et al. | |
| 2008/0275806 A1* | 11/2008 | Raitsev ................ | G06Q 10/087 705/37 |
| 2009/0112775 A1 | 4/2009 | Chiulli et al. | |

(Continued)

OTHER PUBLICATIONS

Eric Hart, "Machine Learning 101, The What, Why, and How of Weighting", 11/209 (Year: 2019).*

(Continued)

*Primary Examiner* — Jamie R Kucab

(57) ABSTRACT

A system and method is disclosed for evaluating a plurality of cryptocurrencies, the method comprising monitoring and storing volatility data for a plurality of cryptocurrency exchanges; analyzing the stored volatility data to generate one or more risk forecasts indicating risks associated with purchasing cryptocurrency through each of the cryptocurrency exchanges; determining a number of transaction factors for purchasing cryptocurrencies and selecting a cryptocurrency based on the transaction factors.

9 Claims, 7 Drawing Sheets

(56) References Cited

U.S. PATENT DOCUMENTS

| | | | |
|---|---|---|---|
| 2012/0330718 A1* | 12/2012 | Jain | G06Q 30/06 705/7.31 |
| 2014/0003263 A1* | 1/2014 | Sheriff | H04W 84/12 370/252 |
| 2014/0324659 A1 | 10/2014 | Runkle et al. | |
| 2015/0120555 A1 | 4/2015 | Jung et al. | |
| 2015/0294424 A1 | 10/2015 | Hakim | |
| 2015/0363769 A1* | 12/2015 | Ronca | G06Q 20/381 705/64 |
| 2015/0365283 A1 | 12/2015 | Ronca et al. | |
| 2016/0203476 A1 | 7/2016 | Henry | |
| 2017/0116608 A1 | 4/2017 | Forzley et al. | |
| 2017/0140371 A1 | 5/2017 | Forzley et al. | |
| 2017/0364999 A1* | 12/2017 | Herriger | G06Q 30/0207 |
| 2018/0025442 A1 | 1/2018 | Isaacson et al. | |
| 2018/0068130 A1 | 3/2018 | Chan et al. | |
| 2018/0075406 A1 | 3/2018 | Kingston et al. | |
| 2019/0230422 A1* | 7/2019 | Hajimusa | H04W 76/15 |
| 2019/0318424 A1 | 10/2019 | McWilliams et al. | |

OTHER PUBLICATIONS

Final Office Action, dated Jul. 23, 2020, by the USPTO, re U.S. Appl. No. 15/953,282.

Final Office Action, dated Jun. 11, 2021, by the USPTO, re U.S. Appl. No. 15/953,282.

International Search Report and Written Opinion; by the ISA/US; dated Jul. 17, 2019; in connection with PCT/IB2019/52322.

Kevin V. Tu; Rethinking Virtual Currency Regulation; Mar. 1, 2015; Washington Law Review, vol. 90, No. 1 (Year: 2015).

Office Action, dated Dec. 28, 2020, by the USPTO, re U.S. Appl. No. 15/953,282.

Office Action, dated Feb. 6, 2020, by the USPTO, re U.S. Appl. No. 15/953,282.

* cited by examiner

RULES ENGINE AND METHOD FOR EVALUATING A PLURALITY OF CRYPTOCURRENCIES

CROSS-REFERENCE TO RELATED APPLICATION

This application is related to commonly owned U.S. patent application Ser. No. 15/953,282, filed Apr. 13, 2018, entitled "SYSTEMS AND METHODS FOR IMPLEMENTING A BLOCKCHAIN-BASED MONEY TRANSFER," the disclosure of which is hereby incorporated by reference in its entirety.

TECHNICAL FIELD

The present disclosure generally relates to money transfer transactions, and more particularly to systems and methods for monitoring a money transfer network and implementing blockchain-based money transfer transactions.

BACKGROUND

Many money transfer service providers operate large money transfer networks that include infrastructure located all over the world. These money transfer networks are utilized to provide money transfer services to customers of the money transfer service providers. For example, the money transfer services allow a first party, referred to as a sending party, to send an amount of funds to a second party, referred to as a receiving party. In order to utilize the money transfer service, the sending party submits a request to the money transfer service provider. The request typically includes information that identifies the sending party and the receiving party, as well as information that indicates the amount of funds, referred to as a send amount, to be transferred to the receiving party. The money transfer service provider typically collects an amount of funds that is greater than the send amount (e.g., due to fees charged by the money transfer service provider for the money transfer transaction service) from the sending party and once the amount of funds is received, a money transfer agent is authorized to fund a remittance of the send amount to a receiving party.

To facilitate money transfer transactions for its customers, a money transfer service provider generally maintains bank accounts in various regions where the money transfer services are to be provided. The amount of funds received from the sending party may be transferred to a first bank account, such as a holding bank account, established with a first bank operating in the region where the sending party is located, and the remittance of the receive amount to the receiving party is funded from a bank account established with a second bank operating in the region where the receiving party is located. For example, where the money transfer transaction is initiated between a sending party located in the United States and a receiving party located in Mexico, funds received from the sending party may be transferred to a first bank account, such as a bank account that the money transfer service provider has established with a bank operating in the United States, and the remittance of the receive amount may be funded from a second bank account, such as a bank account that the money transfer service provider has established with a bank operating in Mexico.

SUMMARY

Systems and methods described herein facilitate the functionality of a network for implementing blockchain-based money transfer transactions between a sending party and a receiving party are described. To facilitate a money transfer transaction, a sending party may provide identification information to a money transfer service provider, which may be utilized to verify the identity of the sending party. In some embodiments, the identification information may be recorded on a blockchain maintained by a money transfer service provider. Once identification information is verified, the system may initiate various operations to select a particular cryptocurrency and/or cryptocurrency exchange for initiating a send transaction in connection with the requested money transfer transaction. A rules engine may be executed against the money transfer transaction request and information derived by monitoring one or more cryptocurrency exchanges to select one or more particular cryptocurrencies and/or cryptocurrency exchanges utilized for the money transfer transaction. Using the derived information, a send transaction may be executed via a purchase of a quantity of cryptocurrency from a first cryptocurrency exchange followed by a transfer of the cryptocurrency to a second exchange. The cryptocurrency may be sold at the second exchange and the proceeds may be utilized to fund a receive transaction. The rules engine may account for multiple transactions taking place between multiple corridors, and may account for multiple cryptocurrency types that are contemporaneously being processed within the money transfer network. Various processes may be implemented to optimize execution of the send transaction, the receive transaction, or both as will be described in more detail below.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of embodiments described herein, both as to its organization and method of operation, together with further objects and advantages will be better understood from the following written description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
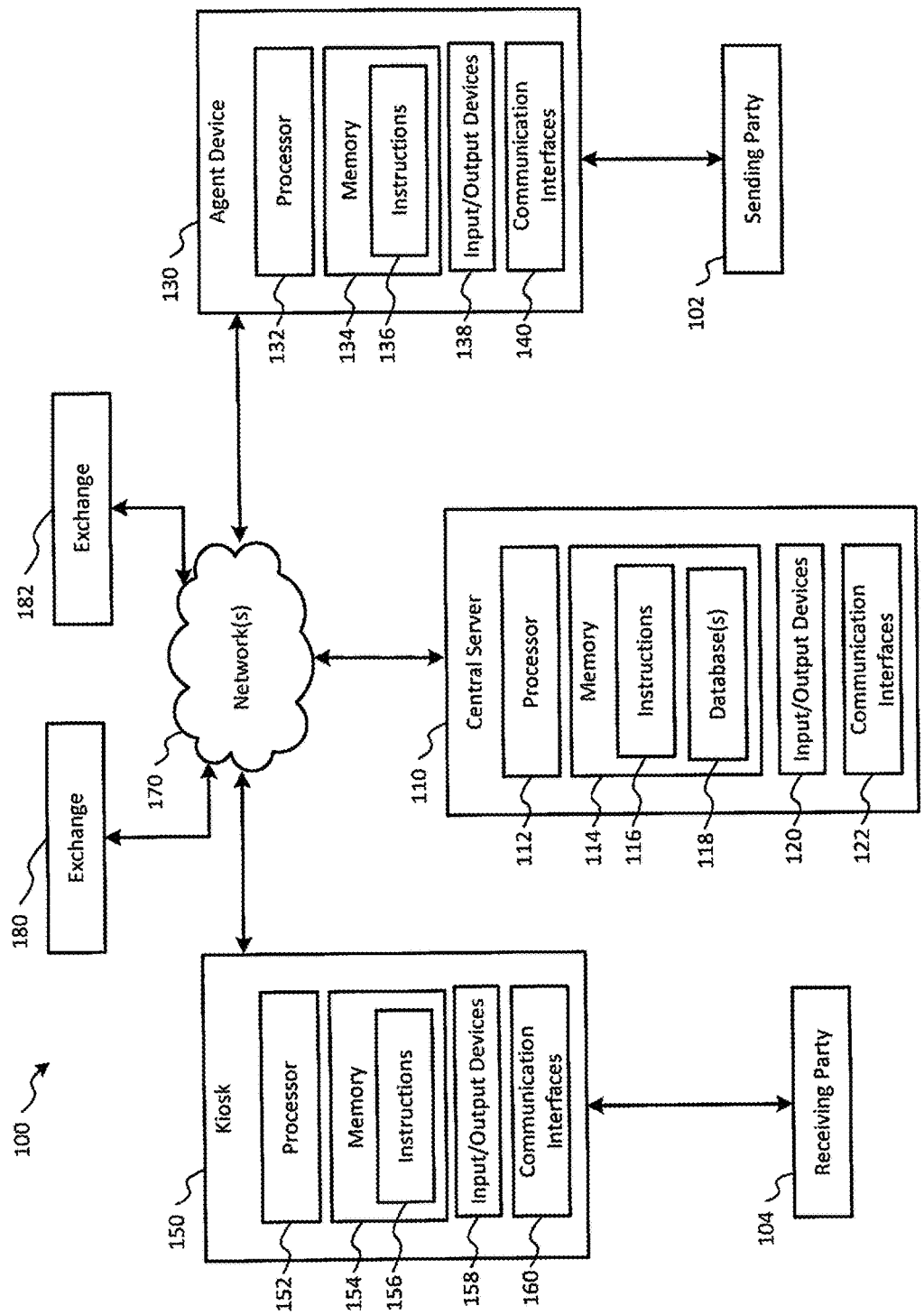
FIG. 1 is block diagram of a system for implementing blockchain-based money transfer transactions between a sending party and a receiving party in accordance with embodiments of the present disclosure.

Referring to FIG. 1, a block diagram of a system for implementing blockchain-based money transfer transactions between a sending party and a receiving party in accordance with embodiments of the present disclosure is shown as a system 100. As shown in FIG. 1, the system 100 includes a central server 110, a plurality of agent devices, and a plurality of cryptocurrency exchanges. The central server 110 may be operated by a money transfer service provider that provides a money transfer services to users (e.g., customers of the money transfer service provider) of the system 100, such as to facilitate a transfer of funds from a sending party 102 to a receiving party, as described in more detail below. It is noted that although FIG. 1 illustrates the plurality of agent devices as including two agent devices (e.g., a first agent device 130 a kiosk device 150) and illustrates the plurality of cryptocurrency exchanges as including two cryptocurrency exchanges (e.g., a first cryptocurrency exchange 180 and a second cryptocurrency exchange 182), this has been done for purposes of illustration, rather than by way of limitation, and the system 100 may include more than two agent devices and/or may utilize more than two cryptocurrency exchanges.

Money transfer transactions performed in accordance with aspects of the present disclosure may be supported by the operations of the central server 110, as well as one or more of the plurality of agent devices. It is noted that agent devices may be operated under the control of the money transfer service provider or an agent of the money transfer service provider. Agent devices of the system 100 may include money transfer agent directed devices and user directed devices. Agent directed devices may be electronic devices adapted to communicate with the central server 110 to provide money transfer transaction services at the direction of one or more money transfer agents. Exemplary agent directed devices that may be used to facilitate money transfer transactions may include point of sale (POS) systems, desktop and/or laptop computers at a money transfer agent location, smartphones, tablet computing devices, and other electronic devices operated by money transfer agents to facilitate money transfer transactions on behalf of users. User directed devices may include electronic devices adapted to communicate with the central server 110 to provide money transfer transaction services to the users without interaction or assistance from money transfer agents. Exemplary user directed devices that may be used to facilitate money transfer transactions may include kiosks, desktop and/or laptop computers, smartphones, tablet computing devices, automated teller machines (ATMs), or other devices configured to enable a user to participate in a money transfer transaction (e.g., to send funds in a send transaction and/or receive funds in a receive transaction) without the assistance of a money transfer agent. It is noted that when a device owned by an entity other than the money transfer service provider is utilized to facilitate money transfer transactions, the entity's device becomes an agent device. For example, a money transfer service provider may provide an application that may be executed on a smartphone owned by a user, and the application may be configured to communicate with a device operated by the money transfer service provider, such as the central server 110, to facilitate the user's participation (e.g., as a sending party and/or receiving party) in money transfer transactions via the smartphone (or another type of user directed device).

In FIG. 1, an exemplary agent directed device is illustrated as agent device 130. As shown in FIG. 1, the agent device 130 includes one or more processors 132, memory 134, I/O devices 138, and one or more communication interfaces 140. The one or more processors 132 may include a single processor or may include two or more processors, and each of the one or more processors 132 may include one or more processing cores. The memory 134 may include ROM devices, RAM devices, one or more HDDs, one or more flash memory devices, one or more SSDs, other devices configured to store data in a persistent or non-persistent state, or a combination of different memory devices. The memory 134 may store instructions 136 that, when executed by the one or more processors 132, cause the one or more processors 132 to perform the operations of the agent device 130, as described herein with respect to FIGS. 1-7. Although not illustrated in FIG. 1 for simplicity of the figure, the memory 134 may store one or more databases that include information used to support the operations of the system 100 for providing blockchain-based money transfer transactions, as described in more detail below. For example, the databases may include information associated with presenting graphical user interfaces (GUIs) configured to capture information utilized to facilitate a money transfer transaction, as described in more detail below.

The one or more I/O devices 138 may include a keyboard, a mouse, a touch screen device, a credit card processing device, a biometric input device (e.g., fingerprint scanner, eye scanner, palm scanner, facial recognition devices, video cameras, other imaging devices, and the like), a receipt printer, a barcode scanner, a currency receptacle, a currency dispenser, a display device, a speaker, and the like. The one or more communication interfaces 140 may be configured to communicatively couple the agent device 130 to one or more networks, such as the one or more networks 170, via a wired or wireless connection established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd generation (3G) protocol, a 4th generation (4G)/long term evolution (LTE) protocol, etc.). The agent device 130 may communicate with the central server 110 via the one or more networks 170. In an aspect, the agent device 130 may also communicate with the kiosk 150 and/or the cryptocurrency exchanges 180, 182 via the one or more networks 170.

In the example that follows, a high level description of a work flow for facilitating at least a portion of the money transfer transaction via an agent directed device, such as the agent device 130, is provided. A money transfer transaction may be viewed as two separate transactions, a send transaction and a receive transaction. A user desiring to initiate a money transfer transaction may visit a money transfer location and interact with a money transfer agent to configure the money transfer transaction. During this process, the agent directed device (e.g., the agent device 130) may present various GUIs to the money transfer agent. The GUIs may be designed to guide the money transfer agent in capturing information from the user in connection with configuring a send transaction or a receive transaction. For a send transaction, the GUIs presented by the agent device 130 may prompt the money transfer agent with questions for the sending party that are designed to elicit information required to initiate a send transaction, such as information that identifies the name and address of the sending party and the receiving party; information that indicates the send amount (e.g., the amount of funds to be provided to the receiving party); a type of payment to be utilized to fund the money transfer transaction; contact information for the sending party and the receiving party (e.g., a telephone number, an e-mail address, and the like); information associated with social security number or other form of government issued identification; bank account information associated with a bank account of the sending party, the receiving party, or both; financial card information associated with a financial card of the sending party, the receiving party, or both; a location where the receiving party is to receive the send amount, and the like. It is noted that the exemplary types of information described above for configuring a money transfer transaction have been provided for purposes of illustration, rather than by limitation, and that money transfer transactions in accordance with embodiments may not utilize all of the aforementioned pieces information or may utilize other pieces information.

The money transfer agent may provide inputs to the various GUIs based on responses from the sending party. After the information has been captured, the money transfer agent may collect and process payment for the money transfer transaction, which may include receiving an amount of fiat currency, charging the payment to a bank account or financial card identified by the information captured by the one or more GUIs, or receiving a quantity of cryptocurrency into one or more crypto-wallets of the money transfer service provider. After the send transaction has been funded, a receipt may be provided to the sending party and instructions for completing the receive transaction may be provided to the receiving party by either the system 100 or the sending party. Where the system 100 transmits the instructions to the receiving party, the instructions may be provided as an e-mail message, a text message, a short messaging service (SMS) message, a push notification, an automated voice response (AVR) message, or a combination of these types of messages.

The receiving party may use the instructions to complete the receive transaction at a user directed device or may visit a money transfer agent location to receive assistance with completing the receive transaction. When the receiving party visits a money transfer agent location to complete the receive transaction, the receiving party may provide information for completing the receive transaction to a money transfer agent. For example, the instructions may include a barcode or an alphanumeric code, and the money transfer agent may scan the barcode using a barcode reader of the agent directed device or input the alphanumeric code into a GUI presented by the agent directed device to identify the receive transaction. The one or more GUIs may also prompt the money transfer agent to request that the receiving party provide additional information, such as information that may be used to confirm the receiving party's identity. Upon verifying the receiving party's identity, the agent directed device may indicate that the money transfer agent is authorized to complete the receive transaction, and the money transfer agent may remit the receive amount (e.g., an amount of funds having a value equal to the send amount) to the receiving party. If the receive amount is to be deposited into an account of the receiving party, the agent directed device or the central server 110 may initiate an electronic funds transfer to deposit the receive amount into the account, such as a bank account of the receiving party. It is noted that the high level work flow described above has been provided for purposes of illustrating how agent directed devices may be used to facilitate portions of a money transfer transaction. Additional aspects of techniques and processes that may be utilized to facilitate portions of a money transfer transaction via agent directed devices in accordance with the present disclosure are described below.

In FIG. 1, an exemplary user directed device is illustrated as kiosk device 150. As shown in FIG. 1, the kiosk device 150 includes one or more processors 152, memory 154, I/O devices 158, and one or more communication interfaces 160. The one or more processors 152 may include a single processor or may include two or more processors, and each of the one or more processors 152 may include one or more processing cores. The memory 154 may include ROM devices, RAM devices, one or more HDDs, one or more flash memory devices, one or more SSDs, other devices configured to store data in a persistent or non-persistent state, or a combination of different memory devices. The memory 154 may store instructions 156 that, when executed by the one or more processors 152, cause the one or more processors 152 to perform the operations of the kiosk device 150, as described herein with respect to FIGS. 1-7. Although not illustrated in FIG. 1 for simplicity of the figure, the memory 154 may store one or more databases that include information used to support the operations of the system 100 for providing blockchain-based money transfer transactions, as described in more detail below. For example, the databases may include information associated with presenting graphical user interfaces configured to capture information utilized to facilitate a money transfer transaction, as described in more detail below.

The one or more I/O devices 158 may include a keyboard, a mouse, a touch screen device, a credit card processing device, a biometric input device (e.g., fingerprint scanner, eye scanner, palm scanner, facial recognition devices, video cameras, other imaging devices, and the like), a receipt printer, a barcode scanner, a currency receptacle, a currency dispenser, a display device, a speaker, and the like. The one or more communication interfaces 160 may be configured to communicatively couple the kiosk device 150 to one or more networks, such as the one or more networks 170, via a wired or wireless connection established according to one or more communication protocols or standards (e.g., an Ethernet protocol, a TCP/IP, an IEEE 802.11 protocol, an IEEE 802.16 protocol, a 3G protocol, a 4G/LTE protocol, etc.). The kiosk device 150 may communicate with the central server 110 via the one or more networks 170. In an aspect, the kiosk device 150 may also communicate with the agent device 130 and/or the cryptocurrency exchanges 180, 182 via the one or more networks 170.

In the example that follows, a high level description of a work flow for facilitating at least a portion of the money transfer transaction via a user directed device, such as the kiosk device 150, is provided. A user desiring to participate in a money transfer transaction may approach a user directed device, such as the kiosk 150 or the user's smartphone, and may be presented with various GUIs designed to capture information from the user in connection with completing the send transaction or the receive transaction. For a send transaction, the GUIs presented by the kiosk 150 may be configured to prompt the sending party for information required to initiate a send transaction, such as the exemplary types of information described above with respect to the GUIs presented at an agent directed device.

After the sending party provides this information, the user directed device may process the payment, which may include receiving an amount of fiat currency at a currency receptacle of the user directed device, charging the payment to a bank account or financial card identified by the information captured by the one or more GUIs, or receiving a quantity of cryptocurrency into one or more crypto-wallets of the money transfer service provider, where the quantity of cryptocurrency was received from the sending party to fund the money transfer transaction. After the send transaction has been funded, a receipt may be provided to the sending party and instructions for completing the receive transaction may be provided to the receiving party by either the system 100 or the sending party. Where the system 100 transmits the instructions to the receiving party, the instructions may be provided as an e-mail message, a text message, an SMS message, a push notification, an AVR message, or a combination of these types of messages.

The receiving party may use the instructions to complete the receive transaction at a user directed device or may visit a money transfer agent location to receive assistance with completing the receive transaction. Where the receiving party utilizes a user directed device to complete the receive transaction, one or more GUIs may be presented to the receiving party and may prompt the receiving party for information that may be utilized to complete the receive transaction. For example, the instructions may include a barcode that may be scanned via a barcode reader of the user directed device to identify the receive transaction, or may include an alphanumeric code that may be provided as an input to identify the receive transaction. The one or more GUIs may also prompt the receiving party to provide information that may be used to confirm the receiving party's identity. Upon verifying the receiving party's identity, the user directed device may complete the receive transaction by dispensing the receive amount (e.g., an amount of funds having a value equal to the send amount) via a currency dispenser of the user directed device, or by initiating an electronic funds transfer to deposit the receive amount into a bank account of the receiving party. It is noted that the high level work flow described above has been provided for purposes of illustrating how user directed devices may be used to facilitate portions of a money transfer transaction without intervention or assistance from a money transfer agent. Additional aspects of techniques and processes that may be utilized to facilitate portions of a money transfer transaction via user directed devices in accordance with the present disclosure are described below. Further, it is noted that work flows for facilitating money transfer transactions in accordance with the present disclosure may include hybrid work flows that utilize a combination of user directed devices and agent directed devices. For example, a sending party may utilize a user directed device, such as the kiosk 150, to stage a money transfer transaction (e.g., provide information necessary to initiate a money transfer transaction), and then interact with a money transfer agent that operates an agent directed device, such as agent device 130, to finalize and complete the money transfer transaction.

The one or more networks 170 may include a wired network, a wireless network, or may include a combination of wired and wireless networks. For example, the one or more networks 170 may include a local area network (LAN), a wide area network (WAN), a wireless WAN, a wireless LAN (WLAN), a metropolitan area network (MAN), a wireless MAN network, a cellular data network, a cellular voice network, the Internet, or a combination of these different networks. Additionally, the one or more networks 170 may include multiple networks operated by different entities. For example, the one or more networks 170 may include a first network operated by an internet service provider (ISP), a private network (e.g., an intranet) operated by the money transfer service provider, and other networks (e.g., the Internet).

As shown in FIG. 1, the central server 110 includes one or more processors 112, memory 114, input/output (I/O) devices 120, and one or more communication interfaces 122. The one or more processors 112 may include a single processor or may include two or more processors, and each of the one or more processors 112 may include one or more processing cores. The memory 114 may include read only memory (ROM) devices, random access memory (RAM) devices, one or more hard disk drives (HDDs), one or more flash memory devices, one or more solid state drives (SSDs), other devices configured to store data in a persistent or non-persistent state, or a combination of different memory devices. The memory 114 may store instructions 116 that, when executed by the one or more processors 112, cause the one or more processors 112 to perform the operations of the central server 110, as described herein with respect to FIGS. 1-7. Additionally, the memory 114 may store one or more databases 118. The one or more databases 118 may store information used to support the operations of the system 100 for providing blockchain-based money transfer transactions, as described in more detail below.

The one or more I/O devices 120 may include a keyboard, a mouse, a touch screen device, a credit card processing device, a biometric input processing device (e.g., fingerprint analysis device, eye scan analysis device, palm scan analysis device, facial recognition device, and the like), a receipt printer, another form of printer, a barcode scanner, and the like. The one or more communication interfaces 122 may be configured to communicatively couple the central server 110 to one or more networks, such as the one or more networks 170 of FIG. 1, via a wired or wireless connection established according to one or more communication protocols or standards (e.g., an Ethernet protocol, a TCP/IP, an IEEE 802.11 protocol, an IEEE 802.16 protocol, a 3G protocol, a 4G/LTE protocol, etc.). The central server 110 may communicate with agent device 130, kiosk 150, and/or cryptocurrency exchanges 180, 182 via the one or more networks 170.

Figure 2:
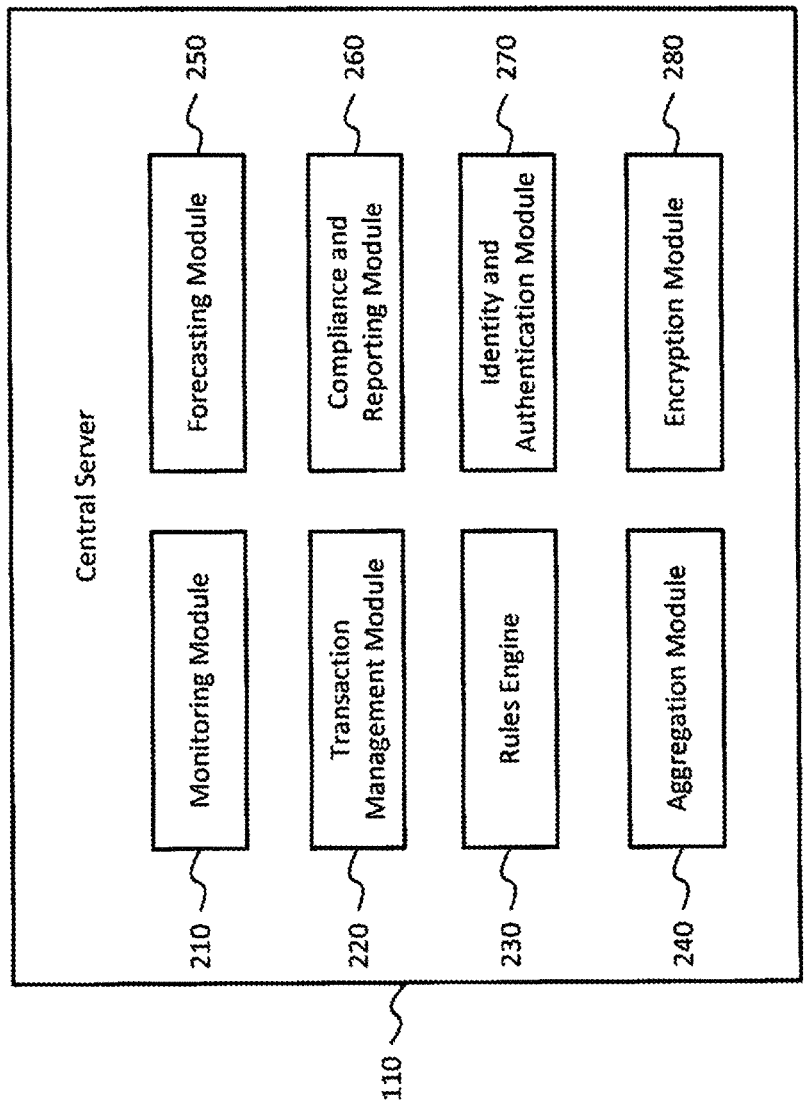
FIG. 2 is a block diagram illustrating functional modules utilized to implement blockchain-based money transfer transactions in accordance with embodiments of the present disclosure.

Referring briefly to FIG. 2, a block diagram illustrating exemplary functional modules utilized to implement blockchain-based money transfer transactions in accordance with embodiments of the present disclosure are shown. As shown in FIG. 2, the exemplary functional modules of the central server 110 may include a monitoring module 210, a transaction management module 220, a rules engine 230, an aggregation module 240, a forecasting module 250, a compliance and reporting module 260, an identity and authentication module 270, and an encryption module 280. Although the functional modules are illustrated in FIG. 2 as being incorporated with the central server 110, it is to be appreciated that the illustrated functional modules may be readily integrated with other devices. For example, the functional modules may readily implemented with agent devices, kiosks, web servers that provide browser-based access to the money transfer services, and servers supporting applications that provide access to the money transfer services from user devices (e.g., applications running on smartphones, tablet computing devices, and personal digital assistants (PDAs)). Additionally, the illustrated functional modules may be implemented in software (e.g., as instructions executable by one or more processors), in hardware (e.g., a microcontroller, a processor, a field programmable gate array (FPGA), an application specific integrated circuit (ASIC), or other processing logic and circuitry), or as a combination of hardware and software. Further, the functional modules may be deployed on a single machine or on multiple machines. Exemplary operations performed by the various functional modules illustrated in FIG. 2 are described in more detail below.

Referring back to FIG. 1, each of the plurality of cryptocurrency exchanges may offer services that facilitate purchases and sales of cryptocurrency, and each of the cryptocurrency exchanges could be utilized under appropriate circumstances to facilitate a money transfer transaction. However, the techniques disclosed herein take various factors into consideration in order to optimize both the cryptocurrencies and cryptocurrency exchanges utilized to facilitate a money transfer transaction. One factor that may be considered is the differences in the cryptocurrencies available at each exchange. Although a large number of cryptocurrencies exist, cryptocurrency exchanges typically facilitate purchases and sales of a limited set of the existing cryptocurrencies. While a significant number cryptocurrency exchanges may facilitate purchases and sales of certain cryptocurrencies, such as Bitcoin, Ethereum, and Litecoin, other cryptocurrencies may only be purchased and sold at a small number of cryptocurrency exchanges. Additionally, although a particular cryptocurrency may be available at multiple cryptocurrency exchanges, the market price for that particular cryptocurrency may be different at each of those cryptocurrency exchanges.

Another factor that may be taken into consideration is the type of payments that may be utilized to purchase cryptocurrencies from the different cryptocurrency exchanges. For example, some cryptocurrency exchanges allow purchases of cryptocurrency using fiat currency (e.g., via wire transfer, debit card, and the like), while other cryptocurrency exchanges require purchases of cryptocurrency to be paid in one or more authorized cryptocurrencies, such as Bitcoin or Ethereum, while other cryptocurrencies may not be authorized for use as payment. Fees may be another factor considered by the system 100. For example, cryptocurrency exchanges may charge fees on each transaction (e.g., transactions to purchases or sell cryptocurrency, transactions to withdraw or transfer cryptocurrency to another account or exchange, transactions to withdrawn funds received as proceeds of a sale of cryptocurrency, etc.) and the fees may be different for each cryptocurrency exchange.

The system 100 may further consider various timing factors associated with various cryptocurrency exchanges and/or cryptocurrencies. For example, the amount of time required to complete a transaction, such as to withdraw proceeds from the sale of a cryptocurrency, may vary from one cryptocurrency exchange to another. As another example, anomalies or events may occur that slow down transactions associated with certain types of cryptocurrencies, such as when congestion caused by significant transaction volume associated with the blockchain-based game CryptoKitties slowed transaction execution times on the Ethereum blockchain.

Geographic factors may also be taken into consideration. Some cryptocurrency exchanges permit conversion of cryptocurrency into a native fiat currency (e.g., a fiat currency associated with the country where an exchange is based), which may impact the money transfer service provider's ability to fund a receive transaction. Additionally, demand for cryptocurrencies may vary across different geographic locations. For example, a first cryptocurrency may have high demand at exchanges associated with a first geographic location, but may have low demand at exchanges associated with a second geographic location. If a money transfer transaction is to be funded in the second geographic location, the first cryptocurrency may not be suitable for facilitating the money transfer transaction because it may be difficult to sell the first cryptocurrency at an exchange associated with the second geographic location. It is noted that the factors described above have been provided for purposes of illustration, rather than by way of limitation, and that the system 100 may take additional factors into consideration when facilitating blockchain-based money transfer exchanges. Additionally, the system 100 may consider all available factors or a subset of all available factors. Also, the system 100 may be configured to apply weights to the factors so that particular factors play a more important role in the selection of cryptocurrency exchanges and/or cryptocurrencies utilized to facilitate money transfer transactions, as described in more detail below. By taking the factors described above into consideration when executing money transfer transactions in accordance with the present disclosure, performance of the system 100 may be improved by increasing the speed at which money transfer transactions can be executed to completion, as well as minimizing the costs associated with providing money transfer transaction services.

A monitoring module (e.g., the monitoring module 210 of FIG. 2) of the central server 110 may be configured to monitor one or more of the plurality of cryptocurrency exchanges, and to derive exchange data based on information obtained during the monitoring. To illustrate, the monitoring module 210 may include an autonomous bot configured to crawl websites corresponding to various cryptocurrency exchanges to identify information associated with the monitored cryptocurrency exchanges. The autonomous bot may be configured to identify, for each monitored exchange, information associated with trading volumes, cryptocurrencies available for purchase and sale, new feeds, press releases, current market prices for cryptocurrencies available for purchase and sale, fiat currencies that may be used when withdrawing funds from an account with a cryptocurrency exchange, and other information that may be relevant to operations of the system 100.

The monitoring module may also include an analysis component configured to analyze portions of the information identified by the autonomous bot. For example, the analysis component may parse news feeds and press releases to identify information that may indicate new cryptocurrencies that have been approved for listing at a particular cryptocurrency exchange, as well as information that indicates when those new cryptocurrencies will be accessible via the particular cryptocurrency exchange. As another example, the analysis component may parse the news feeds and press releases to identify information that may indicate one or more cryptocurrencies that will be de-listed from the particular cryptocurrency exchange, as well as information that indicates when each of those one or more cryptocurrencies will be de-listed (e.g., no longer available for purchase or sale) via the particular cryptocurrency exchange. As yet a further example, the analysis component may be configured to parse the information identified by the autonomous hot to identify information associated with fees charged by the cryptocurrency exchanges, such as fee increases, fee decreases, new fees, etc. Additionally, the analysis component may be configured to periodically execute probing transactions at one or more cryptocurrency exchanges. The probing transactions may include executing a purchase and/or sale of one or more cryptocurrencies at a cryptocurrency exchange, and may be used to analyze transaction times for different cryptocurrencies and/or different exchanges. For example, the probing transactions may provide information that indicates whether a particular cryptocurrency exchange has faster transaction execution times relative to other cryptocurrency exchanges. This may include ranking each of the cryptocurrency exchanges on a per cryptocurrency basis (e.g., a first cryptocurrency exchange may have the fastest execution time for a first cryptocurrency, but a second cryptocurrency exchange may have the fastest execution time for a second cryptocurrency).

As briefly explained above, the central server 110 may be configured to derive exchange data based on the monitoring. In an aspect, the one or more databases 118 may include an exchange database and the exchange data derived based on the monitoring may be stored at the exchange database. The exchange data may include records that include the information obtained during the monitoring and which may be characteristic of the one or more factors described above. For example, the central server 110 may derive the exchange data by calculating various metrics, such as demand metrics and price metrics associated with the plurality of cryptocurrency exchanges. For example, the trading volume information may indicate a number of purchase transactions and sell transactions executed for each of the available cryptocurrencies at a particular exchange. Where the number of sell transactions is higher than the number of purchase transactions, the demand metric may indicate that demand for a particular cryptocurrency is low, and where the number of sell transactions is lower than the number of purchase transactions, the demand metric may indicate that demand for a particular cryptocurrency is high. It is noted that the demand for a particular cryptocurrency may vary from one exchange to another. The demand metrics may indicate demand within different geographic regions for each of the cryptocurrencies available from the plurality of exchanges, and may be used by the central server 110 to identify cryptocurrencies for executing money transfer transactions, as described in more detail below. The price metrics may include information associated with market prices for the cryptocurrencies available via the plurality of exchanges. For example, the price metrics may indicate an average price for a particular cryptocurrency, which may be an average price for each cryptocurrency exchange or an average aggregate price across all cryptocurrency exchanges. The price metrics may also indicate historical prices for each cryptocurrency available at a particular exchange. Additionally, the exchange data may include, for each monitored cryptocurrency exchange, information regarding transaction fees, transaction execution times, available cryptocurrencies, fiat currencies available for withdrawing funds (e.g., proceeds from selling one or more cryptocurrencies), and other information.

The exchange data may also include trend information. The trend information may indicate one or more trends with respect to market prices (e.g., whether the market price for a cryptocurrency is increasing in value, decreasing in value, or stable). The trend information may also indicate one or more trends with respect to transaction times, such as a purchase transaction time trend indicating an amount of time between submitting a purchase transaction and receiving the purchased quantity of cryptocurrency, a withdrawal transaction time trend indicating an amount of time between submitting a request to withdraw funds from a cryptocurrency exchange and receiving the funds into an account of the money transfer service provider, and the like. Transaction time trends may indicate whether transaction times for one or more cryptocurrencies are faster at certain cryptocurrency exchanges relative to other cryptocurrency exchanges, and may also indicate whether a particular blockchain that supports one or more cryptocurrencies is experiencing problems. For example, when transaction times for cryptocurrencies supported by a particular blockchain, such as Ethereum, are decreasing across numerous cryptocurrency exchanges, the central server 110 may determine that the Ethereum blockchain is experiencing congestion, which may signify that transactions involving cryptocurrencies supported by the Ethereum blockchain may be slower than expected. Based on this information, the central server 110 may select a cryptocurrency that is not supported by the Ethereum blockchain if transaction times for that cryptocurrency are faster than the transactions times currently being experienced on the Ethereum blockchain, which may improve transaction times associated with cryptocurrency transactions utilized to support money transfer transactions. However, the central server 110 may select a cryptocurrency that is supported by the Ethereum blockchain despite the slower transaction times indicated by the trend information based on other factors, such as when demand for cryptocurrencies supported by the Ethereum blockchain in a particular geographic location are high and demand for non-Ethereum-based cryptocurrencies is low in the particular geographic location. Additional aspects of determining one or more trends based on information derived by the monitoring module are described below.

The monitoring of cryptocurrency exchanges may include all cryptocurrency exchanges, or may include a subset of the plurality of cryptocurrency exchanges. In an aspect, the one or more databases 118 may include a monitoring configuration database that includes information that specifies the cryptocurrency exchanges that are to be monitored by the monitoring module. The monitored cryptocurrency exchanges may be designated by the money transfer service provider. For example, the central server 110 may be configured to present a GUI that enables the money transfer service provider to view a list of available cryptocurrency exchanges and select the particular cryptocurrency exchanges that are to be monitored by the monitoring module. The GUI may also enable the money transfer service provider to modify the designated cryptocurrency exchanges, such as to add or remove cryptocurrency exchanges from the list of monitored cryptocurrency exchanges.

Additionally or alternatively, the GUI may be configured to enable the money transfer service provider to specify one or more cryptocurrency exchange selection criteria, and the monitoring module may be configured to select the cryptocurrency exchanges that are to be monitored based on the one or more cryptocurrency exchange selection criteria. For example, the one or more cryptocurrency exchange selection criteria may include a transaction time criterion that indicates a threshold transaction time. The monitoring module may be configured to identify cryptocurrency exchanges that offer cryptocurrencies having transaction times that satisfy the transaction time criterion. For example, probing transactions may be executed at different exchanges for different cryptocurrencies to identify cryptocurrency-exchange pairs that facilitate transactions having transaction times that are faster than a threshold transaction time specified by the transaction time criterion. It is noted that many cryptocurrency exchanges may offer a particular cryptocurrency, but only some of the cryptocurrency exchanges may facilitate transaction times that satisfy the transaction time criterion. Thus, only those cryptocurrency exchanges that facilitate transactions with respect to the particular cryptocurrency and satisfy the transaction time criterion may be monitored. Another exemplary cryptocurrency exchange selection criterion may be associated with trading volume. For example, a trading volume criterion may be defined that specifies a minimum trading volume, and only cryptocurrency exchanges that have trading volumes equal to or above the minimum trading volume may be selected for monitoring.

It is noted that the exemplary cryptocurrency exchange selection criteria described above have been provided for purposes of illustration, rather than by way of limitation, and that the system 100 may utilize additional cryptocurrency exchange selection criteria depending on the particular configuration of the system 100. Further, the monitoring module may be configured to periodically re-evaluate the monitored cryptocurrency exchanges based on the cryptocurrency exchange selection criteria, and the money transfer service provider may periodically modify the cryptocurrency exchange selection criteria, such as to add or remove a selection criterion, or modify a threshold associated with a particular selection criterion. For example, if it is discovered that only a small number of cryptocurrencies are available due to constraints imposed by the transaction time criterion, the threshold transaction time may be increased, which may allow additional cryptocurrencies and/or exchanges to be identified for use in facilitating money transfer transactions. As described in more detail below, the central server 110 may utilize the exchange data derived based on the monitoring to execute money transfer transactions in accordance with the present disclosure.

The central server 110 may include a transaction management module (e.g., the transaction management module 220 of FIG. 2) configured to provide an interface between the central server 110 and one or more external systems, such as agent devices, kiosks, cryptocurrency exchanges, user devices, and the like. For example, a user, such as the sending party 102, may utilize the kiosk 150 or visit an agent location associated with agent device 130 to configure a request to initiate a money transfer transaction between a sending party and a receiving party. As explained above, the request may include information that identifies at least the sending party, the receiving party, and a send amount, as well as other information, such as bank account information, financial card information, information that identifies a location where the receiving party is to complete a receive transaction, or other information. As another example, the sending party may configure the request to initiate the money transfer transaction using an electronic device owned by the sending party 102, such as via an application running on a smartphone or tablet computing device of the sending party 102 or a browser-based application presented to the sending party via a web browser. Irrespective of the particular device utilized to configure the request, once the request has been configured, the request may be transmitted to the central server 110, where it is detected and received by the transaction management module.

Upon receiving the request, the transaction management module may generate a set of parameters for the money transfer transaction based on the information included in the request. The set of parameters may include a value parameter, a corridor parameter, one or more regulatory compliance parameters, a quality of service parameter, authorization parameters, party parameters, one or more funding parameters, or other parameters. The value parameter may indicate the send amount for the money transfer transaction request. The corridor parameter may identify a corridor associated with the money transfer transaction request. For example, if the request was originated by a sending party located in the United States and the receiving party was located in Mexico, the corridor parameter may identify a US-Mexico corridor. It is noted that the corridor parameter may simply identify the geographic locations, such as countries where the send transaction and the receive transaction are performed, or may be more specific, such as to identify a city and country where the send transaction and the receive transaction are performed. Other techniques may also be used to specify the corridor parameter depending on the particular implementation used by the money transfer transaction service provider. The one or more regulatory compliance parameters may identify various regulations that money transfer transactions may be subject to in one or more jurisdictions associated with the identified corridor, which may include regulations imposed by a third party, such as regulations imposed by one or more government agencies, and/or regulations imposed by the money transfer service provider. The quality of service parameter may identify a quality of service associated with the money transfer transaction request, such as an expected amount of time until the receive transaction may be executed and funds provided to the receiving party. The authorization parameters may indicate whether the money transfer transaction is authorized for execution. For example, a send transaction may not be executed until payment of the send amount has been charged and a receive transaction may not be executed until a sale of cryptocurrency having a value corresponding to the receive amount has been completed. The authorization parameters may be updated during the course of processing the money transfer transaction to authorize various stages of the money transfer transaction, such as authorizing a send transaction in response to confirming receipt of funds from the sending party and authorizing a receive transaction in response to confirming a sale of cryptocurrency, where the proceeds of the sale are used to fund the receive transaction. The party parameters may identify the sending party and the receiving party for the money transfer transaction. The funding parameters may indicate a method of funding the send transaction and/or a method of funding the receive transaction (e.g., fiat currency, from and/or to a bank account, from and/or to a prepaid financial card, cryptocurrency, and the like). The particular methods used to fund the send transaction and the receive transaction may be the same or may be different. For example, a send transaction may be funded using fiat currency, but the receive transaction may be funded using cryptocurrency. It is noted that the various parameters described above have been provided for purposes of illustration, rather than by way of limitation, and that money transfer transactions in accordance with the present disclosure may utilize all of these parameters or less than all of these parameters. Further, the central server 110 may be configured to utilize additional parameters depending on the particular configuration of the system 100.

The transaction management module may receive funding information that indicates an amount of funds at least equal to the send amount has been received. For example, where the money transfer transaction request is received from an agent device, the funding information may indicate that an amount of funds at least equal to the send amount has been received from the sending party at a money transfer agent location. If the money transfer transaction request is received from another device, such as from the kiosk 150 or from an application executing on the sending party's electronic device, the funding information may indicate that the other device has received payment from the sending party (e.g., via the currency receptacle of the kiosk 150, an electronically processed payment, or some other form of payment).

The transaction management module may be configured to invoke a rules engine (e.g., the rules engine 230 of FIG. 2) in response to receiving the funding information. In an aspect, invoking the rules engine includes passing the set of parameters generated for the money transfer transaction corresponding to the funding information to the rules engine. The rules engine may be configured to evaluate the set of parameters and the exchange data against a set of rules to select a cryptocurrency for executing the money transfer transaction. For example, the set of rules may be configured to determine a corridor associated with the money transfer transaction based on one or more parameters, such as party parameters that identify the sending party location and the receiving party location, or a corridor parameter that identifies a corridor associated with the money transfer transaction. Additionally, the set of rules may be configured to identify one or more candidate cryptocurrencies based on the funding parameters. For example, where a receive transaction is associated with a remittance of fiat currency, the candidate cryptocurrencies may be identified from among cryptocurrencies available from cryptocurrency exchanges that support withdrawals of funds in an appropriate type of fiat currency (e.g., a type of fiat currency utilized at the location where the receive transaction is to be executed).

Once the candidate cryptocurrencies have been identified, the set of rules may select a particular cryptocurrency and a cryptocurrency exchange that are to be utilized for the money transfer transaction based on the exchange data. To illustrate, the set of rules may identify portions of the exchange data relevant to the identified candidate cryptocurrencies and then utilize one or more metrics included in the exchange data to select the particular cryptocurrency and cryptocurrency exchange that are to be utilized to execute the money transfer transaction. The set of rules may seek to optimize execution of the money transfer transaction over one or more metrics, such as cost, time, volatility/risk, other metrics, or a combination of different metrics (e.g., cost and time, time and volatility/risk, etc.). Optimization of the money transaction based on time may seek to select a cryptocurrency and cryptocurrency exchange that may facilitate the fastest money transfer transaction. For example, the cryptocurrency and cryptocurrency exchange that have the fastest transaction execution time and support the method of funding the money transfer transaction may be selected based on the exchange data. Optimization of the money transfer transaction based on cost may seek to select a cryptocurrency and cryptocurrency exchange that results in the lowest fees charged with respect to cryptocurrency transactions utilized to execute the money transfer transaction. Optimization of the money transfer transaction based on volatility/risk may seek to select a cryptocurrency and cryptocurrency exchange that poses the least amount of risk for executing the money transfer transaction. The price of some cryptocurrencies can be very volatile (e.g., price fluctuations of 20% up or down in a single day or even in a matter of minutes or hours); rules to optimize the money transfer transaction based on volatility/risk may select a cryptocurrency and cryptocurrency exchange that poses the least amount of potential loss (e.g., the price of the cryptocurrency decreasing prior to completing a sale of cryptocurrency to fund the money transfer transaction) or delay (e.g., if the price of a cryptocurrency purchased to facilitate the money transfer transaction drops significantly, the system 100 may delay initiating a sale of the cryptocurrency until the price has risen). The set of rules may consider trend information when evaluating the set of parameters, such as to analyze current trends with respect to pricing, demand, or other factors when selecting the particular cryptocurrency and/or cryptocurrency exchange that is to be utilized to facilitate the money transfer transaction.

As a result of evaluating the set of parameters and the exchange data against the set of rules, the rules engine may provide information to the transaction management module that identifies the cryptocurrency and cryptocurrency exchange that are to be utilized to facilitate the money transfer transaction. It is noted that the rules engine may identify multiple cryptocurrency exchanges for a single money transfer transaction. To facilitate the money transfer transaction, the transaction management module may initiate a send transaction. The initiation of the send transaction may include initiating the purchase of a quantity of the selected cryptocurrency (e.g., a quantity of the selected cryptocurrency having a value that is equal to the send amount) from a first cryptocurrency exchange (e.g., a cryptocurrency exchange supporting the location of the sending party) using funds associated with the send amount. Alternatively, the send transaction may be initiated utilizing a quantity of the selected cryptocurrency that was purchased prior to receiving the money transfer request, as described in more detail below.

Once the quantity of the selected cryptocurrency has been obtained, the transaction management module may transfer the quantity of cryptocurrency to a second cryptocurrency exchange and initiate a sale of the quantity of cryptocurrency via the second cryptocurrency exchange. The proceeds of the sale (e.g., fiat currency) at the second cryptocurrency exchange may be utilized to fund the receive transaction, such as by withdrawing the proceeds of the sale from the second cryptocurrency exchange and depositing them into an account of the money transfer service provider (or money transfer service agent) that may be utilized to remit the funds to the receiving party. In an aspect, rather than waiting until the sale is complete and then withdrawing the proceeds to fund the receive transaction, the transaction management module may be configured to fund the receive transaction from a financial account of the money transfer service provider (or money transfer agent) and initiate the sale of the quantity of cryptocurrency. Once the sale is completed, the proceeds may be withdrawn and deposited to the financial account used to fund the receive transaction (e.g., to replenish the account balance). In this manner, any delays associated with the withdrawal of the proceeds may be eliminated. It is noted that where the funding parameters indicate the receive transaction is to be paid in cryptocurrency, the quantity of the selected cryptocurrency may be obtained from a single exchange (e.g., via a purchase transaction) or may have been previously obtained (e.g., from reserve cryptocurrency quantities maintained by the money transfer service provider), and the receive transaction, once authorized, may be executed by transferring the quantity of the selected cryptocurrency to a receive address associated with the receiving party.

Executing the money transfer transaction in this manner (e.g., via a series of purchases and sales of cryptocurrency) may increase the speed at which funds may be transferred between remote geographic areas, such as different countries. For example, traditionally money transfer service providers utilize banking networks to transfer funds, but such services are time consuming and often are associated with high fees. In contrast, cryptocurrencies may be transferred between cryptocurrencies in a matter of seconds or minutes, allowing the funds to be moved between countries more quickly, and the cost to do so may be significantly lower than the fees associated with traditional banking-type transfers. Additionally, banking networks may have limited availability during certain periods of the day, but cryptocurrency exchanges may operate 24 hours a day, 7 days a week, which allows money transfer transactions to be executed with similar execution times irrespective of the time of day the money transfer transaction is executed (e.g., it may be 1:00 PM at the sending party location and 4:00 AM at the receiving party location). Thus, executing money transfer transactions utilizing cryptocurrency in accordance with the present disclosure may improve the speed at which the system 100 can execute money transfer transactions as compared to prior money transfer systems that relied upon banking networks.

Figure 3:
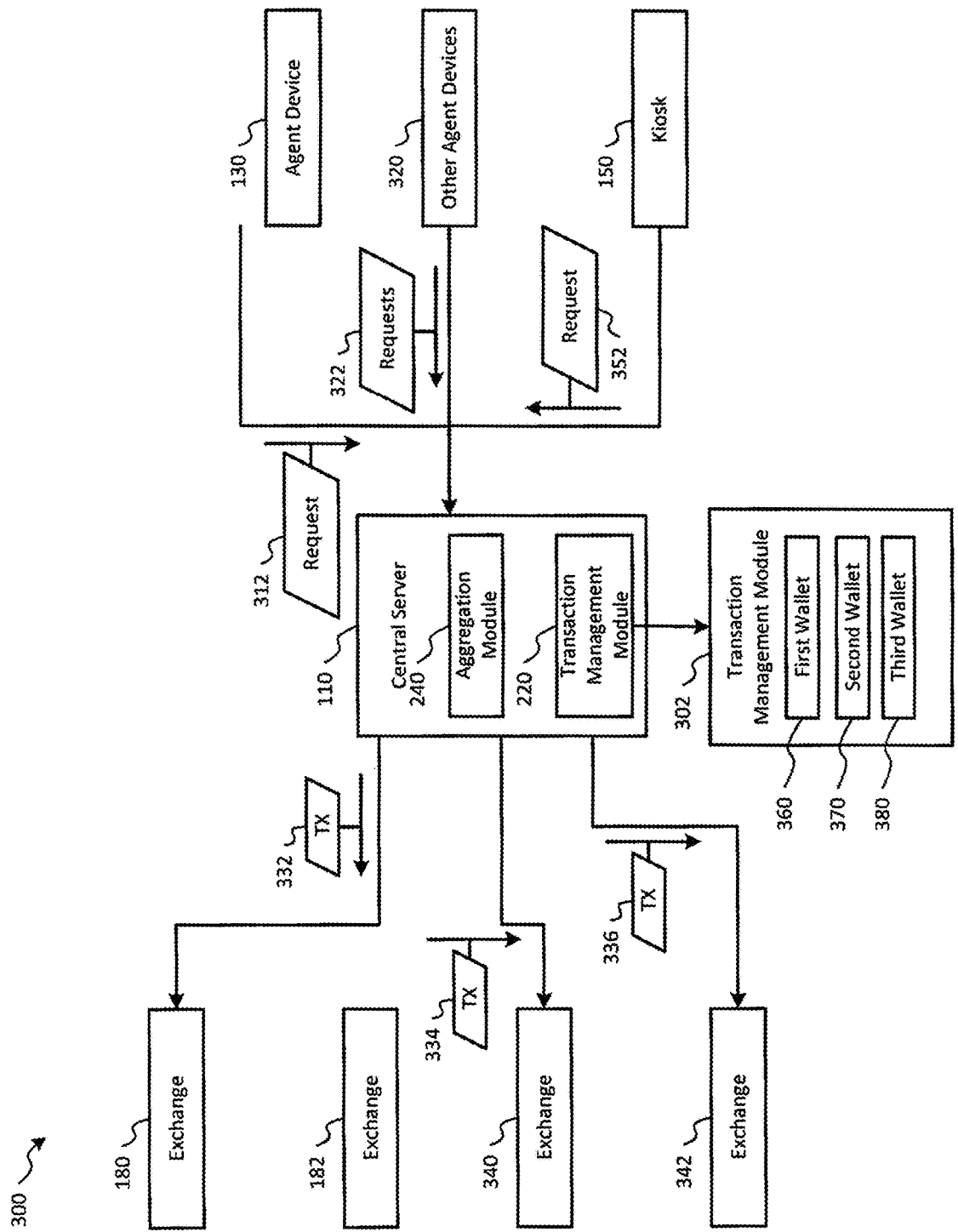
FIG. 3 is a block diagram illustrating aggregation techniques for implementing blockchain-based money transfer transactions in accordance with embodiments of the present disclosure.

In an aspect, the transaction management module may facilitate multiple money transfer transactions in cooperation with an aggregation module (e.g., the aggregation module 240 of FIG. 2), which may allow the system 100 to realize additional benefits. For example, and referring to FIG. 3, a block diagram illustrating aggregation techniques for implementing blockchain-based money transfer transactions in accordance with embodiments of the present disclosure is shown. In FIG. 3, the central server 110, the agent device 130, the kiosk 150, and cryptocurrency exchanges 180, 182 are shown. Additionally, the transaction management module 220 and the aggregation module 240 of FIG. 2 are shown. FIG. 3 also illustrates additional agent devices 320, which may include one or more agent directed devices and/or one or more user directed devices, as described above with reference to FIG. 1, and additional cryptocurrency exchanges 340, 342.

As illustrated in FIG. 3, the central server 110 may receive a plurality of money transfer transaction requests, which may include a request 312 received from the agent device 130, a request 352 received from the kiosk 150, and one or more additional requests 322 received from the other agent device 320. The transaction management module 220 may detect these requests and generate parameter sets for each received request, as described above. Additionally, the transaction management module 220 may coordinate with the aggregation module 240 to facilitate processing of the requests. The aggregation module 240 may be configured to select cryptocurrencies for executing each of the requested money transfer transactions. For example, the aggregation module 240 may utilize the rules engine 230, the sets of parameters generated by the transaction management module 220, and the exchange data to select cryptocurrencies for executing each of the requested money transfer transactions, as described above with reference to FIG. 1.

After identifying the set of cryptocurrencies to be utilized to execute the money transfer transactions, the aggregation module may generate one or more money transfer transaction groups. Each of the one or more money transfer transaction groups may correspond to a different cryptocurrency, and the aggregation module 240 may be configured to associate each of the requested money transfer transactions with a particular money transfer transaction group. For example, a money transfer transaction associated with the request 312 may be assigned to a first money transfer transaction group corresponding to a first cryptocurrency based on selection of the first cryptocurrency for executing the first money transfer transaction, and a second money transfer transaction associated with request 352 may be assigned to a second money transfer transaction group corresponding to a second cryptocurrency based on selection of the second cryptocurrency for executing the second money transfer transaction. It is noted that although only two money transfer transaction groups are described above, the aggregation module 240 may generate a single money transfer transaction group (e.g., where only a single cryptocurrency is to be used for executing the money transfer transactions) or may generate more than two money transfer transaction groups.

After assigning each requested money transfer transaction to a particular money transfer transaction group, the aggregation module 240 may be configured to determine aggregate send amounts for each of the one or more money transfer transaction groups. The aggregate send amounts may be determined for each money transfer transaction group based on send amounts identified in the money transfer requests assigned to the different money transfer transaction groups. Because each money transfer transaction group corresponds to a particular type of cryptocurrency, the aggregate send amounts determined for each group may indicate quantities of each cryptocurrency needed to facilitate the requested money transfer transactions.

Once the quantities for each cryptocurrency have been determined, the aggregation module 240 may utilize rules engine 230 to select particular cryptocurrency exchanges that are to be utilized to purchase the quantities of cryptocurrency, as described above with respect to FIG. 1. The aggregation module 240 may coordinate with the transaction management module 220 to facilitate the purchase of the quantities of cryptocurrency from each of the identified cryptocurrency exchanges. For example, a first cryptocurrency may be purchased from a first cryptocurrency exchange and a second cryptocurrency may be purchased from a second cryptocurrency exchange. It is noted that the quantity of a particular cryptocurrency purchased may be sufficient to execute only a single money transfer transaction (e.g., where a particular money transfer transaction group includes only one money transfer transaction), or may be sufficient to execute multiple money transfer transactions (e.g., where a particular money transfer transaction group includes two or more money transfer transactions).

To illustrate, the transaction management module 220 may purchase a first cryptocurrency from cryptocurrency exchange 180 via a purchase transaction 332, a second cryptocurrency from cryptocurrency exchange 340 via a purchase transaction 334, and a third cryptocurrency from cryptocurrency exchange 342 via a purchase transaction 336. The transaction management module 220 may be configured to manage one or more crypto-wallets, shown in FIG. 3 at 302 as including crypto-wallets 360, 370, 380. The different crypto-wallets managed by the transaction management module may each be associated with a different cryptocurrency and/or cryptocurrency exchange. To illustrate, the money transfer service provider may maintain an account with each of the plurality of cryptocurrency exchanges and each account may be associated with at least one crypto-wallet configured to receive a particular cryptocurrency. For example, a first cryptocurrency exchange may facilitate transactions using a first cryptocurrency; a second cryptocurrency exchange may facilitate transactions using the first cryptocurrency, a second cryptocurrency, and a third cryptocurrency; a third cryptocurrency exchange may facilitate transactions using a fourth cryptocurrency, a fifth cryptocurrency, and a sixth cryptocurrency; and a fourth cryptocurrency exchange may facilitate transactions using the first cryptocurrency, the second cryptocurrency, and the fifth cryptocurrency; and the transaction management module 220 may be configured to manage one or more crypto-wallets at each of the first, second, third, and fourth cryptocurrency exchanges (e.g., one crypto-wallet for each cryptocurrency available at a particular exchange). It is noted that FIG. 3 shows three crypto-wallets for purposes of illustration, rather than by way of limitation and that the system 100 may utilize more than three crypto-wallets or less than three crypto-wallets depending on a particular configuration of the system 100. Further, it is noted that different cryptocurrency exchanges of the plurality of cryptocurrency exchanges may facilitate transactions using different sets of one or more cryptocurrency exchanges and therefore the money transfer service provider may have different numbers and types of crypto-wallets at the different cryptocurrency exchanges utilized by the money transfer network.

Figure 4:
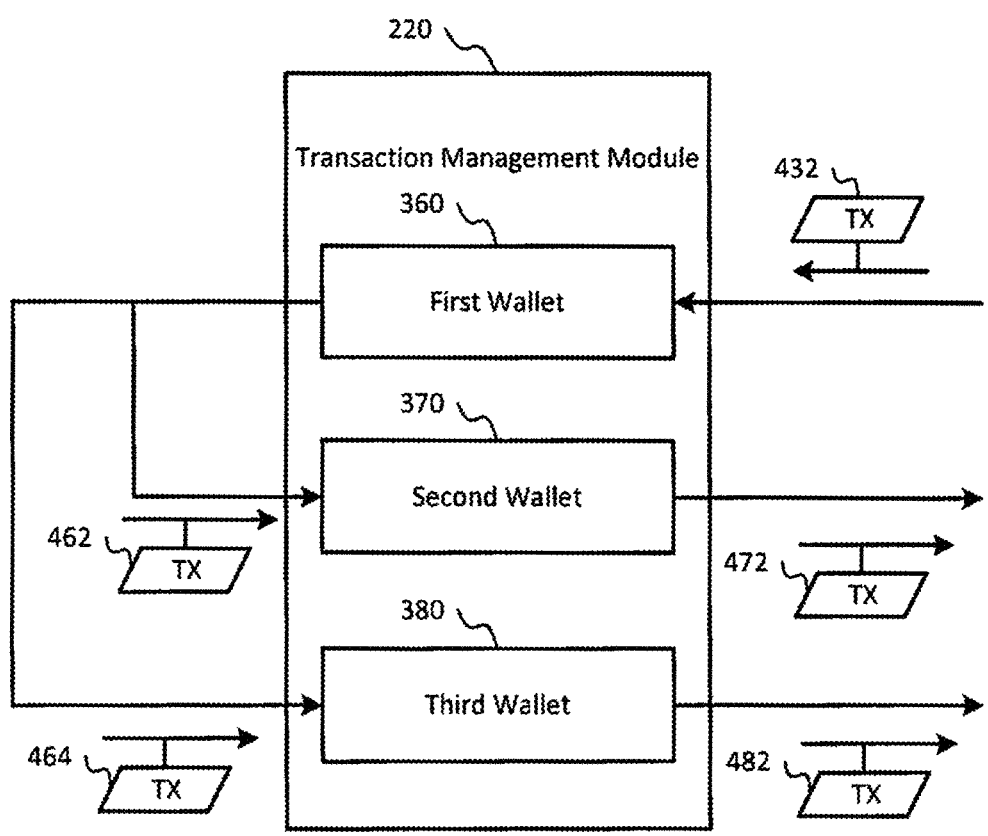
FIG. 4 is a block diagram illustrating exemplary techniques for managing distribution of cryptocurrencies utilized to facilitate blockchain-based money transfer transactions in accordance with embodiments of the present disclosure.

The crypto-wallets may be utilized to redistribute purchased quantities of cryptocurrency to facilitate portions of requested money transfer transactions. For example, and referring to FIG. 4, a block diagram illustrating exemplary techniques for managing distribution of cryptocurrencies utilized to facilitate blockchain-based money transfer transactions in accordance with embodiments of the present disclosure is shown. In FIG. 4, the transaction management module 220 of FIG. 2 and the crypto-wallets 360, 370, 380 of FIG. 3 are shown. As shown in FIG. 4 at transaction 432, a quantity of cryptocurrency may be purchased and stored in crypto-wallet 360, which may be a crypto-wallet associated with the purchased type of cryptocurrency. For example, where the cryptocurrency is Bitcoin, the crypto-wallet 360 may be configured to store quantities of Bitcoin. The crypto-wallet 360 may be a wallet maintained with the cryptocurrency exchange from which the quantity of cryptocurrency was purchased, or may be a crypto-wallet maintained external to any particular cryptocurrency exchange. Once the quantity of cryptocurrency is received into crypto-wallet 360, the transaction management module 220 may transfer at least a portion of the cryptocurrency to one or more additional wallets.

For example, the transaction 432 may correspond to a purchase of cryptocurrency in connection with an aggregation of multiple money transfer transactions and portions of the cryptocurrency may be transferred to additional crypto-wallets to facilitate execution of different money transfer transactions associated with the aggregated money transfer transactions. For example, a first portion of the cryptocurrency acquired in transaction 432 may be transferred to crypto-wallet 370 via a transfer transaction 462 and a second portion of the cryptocurrency acquired in transaction 432 may be transferred to crypto-wallet 380 via a transfer transaction 464. The portions of the cryptocurrency transferred to crypto-wallets 370, 380 may be utilized to facilitate execution of one or more money transfer transactions. For example, a transaction 472 may be executed to sell a portion of the cryptocurrency stored in crypto-wallet 370 and proceeds of the transaction 472 may be used to fund a particular money transfer transaction, as described above with respect to FIG. 1. In addition to selling cryptocurrencies stored within crypto-wallets, the transaction management module 220 may be configured to transfer quantities of cryptocurrency to receiving parties. For example, a transaction 482 may be executed to transfer a portion of the cryptocurrency stored in crypto-wallet 380 to a receive address specified by the receiving party. Thus, the transaction management module may be configured to fund portions of money transfer transactions, such as receive transactions, using fiat currency, as described with reference to the transaction 472, or using cryptocurrency, as described with reference to the transaction 482.

Aggregating money transfer transactions in this manner may result in significant cost savings to the system 100. For example, cryptocurrency exchanges often provide significant discounts of 5%, 10%, or more off the current market price when an entity makes a large purchase of cryptocurrency. By consolidating many money transfer transactions into a single purchase of cryptocurrency, the system 100 may take advantage of these discounts, thereby reducing the costs to provide the money transfer service and to operate the system 100. Additionally, the extra step to redistribute portions of the cryptocurrency to different crypto-wallets may have minimal impact on the quality of service provided due to the low transaction execution times typically experienced when performing such transfers. Further, the rules engine may account for any delays, whether minimal or significant, that may be experienced by the system 100 when selecting the particular cryptocurrency exchange that is to be utilized to purchase quantities of cryptocurrency when aggregation is utilized.

The different crypto-wallets utilized by the system 100 may be associated with different accounts and/or different entities. For example, the money transfer service provider may maintain one or more crypto-wallets for each cryptocurrency exchange for which the money transfer service provider has established accounts for purchasing and selling cryptocurrency, as described above. Additionally, one or more crypto-wallets may be established for each money transfer agent. Establishing crypto-wallets for each money transfer agent may enable money transfer agent devices to facilitate portions of the operations to provide money transfer transactions in accordance with the present disclosure. For example, where aggregation is not utilized, agent directed devices may be configured to initiate purchase transactions and sales transactions to acquire cryptocurrency and then sell the cryptocurrency to fund the money transfer transaction (or fund the receive transaction using cryptocurrency). In an aspect, this may involve coordination of multiple agent devices. For example, a first agent device may purchase cryptocurrency (e.g., using the process described above with reference to FIG. 1) using funds received from the sending party, and may transfer the purchased cryptocurrency to a crypto-wallet associated with a second agent device, a second money transfer agent, or the central server 110. The second agent device, the second money transfer agent, or the central server 110 may then sell the cryptocurrency to fund the receive transaction or the cryptocurrency may be transferred to the receiving party by the first agent device or the second agent device directly (e.g., to fund the money transfer transaction using crypto currency). Where aggregation is used, the central server 110 may utilize crypto-wallets associated with the central server 110 to acquire aggregate amounts of cryptocurrency and then distribute portions of the aggregate amounts of cryptocurrency to different crypto-wallets associated with different agent devices or money transfer agents where different money transfer transactions are to be funded. Once the portions of the cryptocurrency are received at the crypto-wallets of the agent devices (or money transfer agents), transactions to sell the cryptocurrency may be executed to fund receive transactions. It is noted that the particular arrangements and utilizations of crypto-wallets described above have been provided for purposes of illustration, rather than by way of limitation and other arrangements and utilizations of crypto-wallets may be utilized by money transfer networks configured in accordance with the present disclosure.

Referring back to FIG. 1, the one or more databases 118 may include a transaction database that is used to record information associated with various transactions executed by the system 100. For example, the transaction database may include information associated with money transfer transactions, transactions to purchase or sell cryptocurrency, transactions to transfer cryptocurrency, and the like. The information associated with a money transfer transaction may indicate a status of a send transaction and a receive transaction, such as completed or pending, a type of cryptocurrency utilized to facilitate the money transfer transaction, a corridor associated with the money transfer transaction, a money transfer agent location facilitating completion of the send transaction and the receive transaction, or other information. One or more portions of the records may be timestamped, such as a timestamp indicating the time when the send transaction was completed, a timestamp indicating when the receive transaction was completed. The records may include price information that indicates a purchase price for the cryptocurrency acquired to facilitate the money transfer transaction as well as a sales price or a market price at the time the cryptocurrency is disposed of in connection with the receive transaction (e.g., either via a sales transaction or transfer to the receiving party).

The central server 110 may include a forecasting module (e.g., the forecasting module 250 of FIG. 2) that is configured to produce forecasts or predictions with respect to various aspects of operating a money transfer network in accordance with the present disclosure, such as future demand for cryptocurrencies in connection with providing money transfer transactions, risk forecasts, and the like. For example, rather than executing purchase transactions to acquire quantities of one or more cryptocurrencies after money transfer transactions have been received, the forecasting module may be configured to execute a set of forecasting rules against historical transaction data stored in the transaction database to predict future demand for utilization of at least one cryptocurrency (e.g., to facilitate money transfer transactions). The set of forecasting rules may be configured to analyze the historical transaction data to identify an average number of money transfer transactions executed over a defined time period (e.g., a day, a week, a month, or some other time period), as well as one or more average aggregate send amounts over the defined time period. The average aggregate send amounts may be determined on a per cryptocurrency basis, which may indicate average quantities of different cryptocurrencies the system 100 utilizes over the defined time period. For example, the forecasting module may determine that the system 100, on average, utilizes a first quantity of a first cryptocurrency and a second quantity of a second cryptocurrency to facilitate money transfer transactions during the time period.

The forecasting module may generate a first forecasted demand for the first cryptocurrency and a second forecasted demand for the second cryptocurrency based on the analysis of the historical transaction data. The transaction module may purchase a quantity of the first cryptocurrency in accordance with first forecasted demand and a quantity of the second cryptocurrency in accordance with the second forecasted demand. Once purchased, the quantity of the first cryptocurrency and the quantity of the second cryptocurrency may be utilized to facilitate execution of received money transfer transactions. Purchasing quantities of cryptocurrency based on forecasted demand provides advantages over the aggregation techniques described above, where multiple received money transfer transactions are aggregated and a purchase of cryptocurrency is made to facilitate the aggregated money transfer transactions. For example, purchasing quantities of cryptocurrency based on forecasted demand allows the system 100 to take advantage of the discounts available when purchasing large quantities of cryptocurrency. Utilizing forecasted demand to purchase quantities of cryptocurrency also allows money transfer transactions to be executed more quickly. For example, because quantities of cryptocurrency are purchased independent of or prior to receiving money transfer requests, send transactions may be executed immediately upon authorization without having to first execute transactions to purchase cryptocurrency. This reduces the amount of time required to complete execution of a money transfer transaction, thereby improving the speed at which the money transfer network can provide money transfer services.

Purchasing quantities of cryptocurrency in excess of current demand based solely on the forecast data may increase the money transfer service provider's exposure to financial loss. To illustrate, suppose the transaction management module purchased $1,000,000 of a particular cryptocurrency for facilitating a forecasted volume of money transfer transactions on a particular day, but on that day money transfer transactions having an aggregate value of $500,000 were received. In such a scenario the money transfer service provider since would still hold $500,000 worth of the particular cryptocurrency after executing all of the money transfer transactions for that day. Cryptocurrencies commonly experience large price fluctuations. If the value of the particular cryptocurrency dropped 10%, the money transfer service provider would be exposed to a potential loss $50,000, and price drops of 30% or more are frequent with many cryptocurrencies, which would increase the potential loss to the money transfer service provider. While the money transfer service provider may recover the loss in value if the price eventually recovers and/or exceeds the price of the cryptocurrency prior to the drop in value, holding onto the cryptocurrency could tie up a significant amount of funds that would otherwise be available to the money transfer service provider. The forecasting module may be configured to analyze the exchange data and transaction data to generate one or more risk forecasts that indicate risks associated with facilitating money transfer transactions using one or more cryptocurrencies and based on the trends.

To illustrate, the exchange data compiled by the monitoring module may include historical demand metrics that indicate an average number of money transfer transactions that utilize a particular cryptocurrency in a defined time period (e.g., hourly, daily, weekly, monthly, etc.), an average value of money transfer transactions that utilize the particular cryptocurrency in the defined period of time, information associated with a volume of transactions (e.g., a volume of purchase transactions and sell transactions) utilizing the particular cryptocurrency at one or more cryptocurrency exchanges over time, price fluctuations of the particular cryptocurrency at the one or more cryptocurrency exchanges over time, and/or other historical demand metrics. The forecasting module may determine one or more trends based on the historical demand metrics for the particular cryptocurrency. The one or more trends may, for example, include transaction demand trends, which may indicate whether demand for executing money transfer transactions is higher for certain days of the month, such as on the first and fifteenth of each month, and that significantly lower demand is experienced leading up to those two days. The transaction demand trends may include transaction demand trends corresponding to one or more corridors. For example, a transaction demand for a particular corridor may indicate trends with respect to demand for executing money transfer transactions between a sending party located at a first location (e.g., a city, state, country, etc.) and a receiving party located at a second location (e.g., a second city, state, country, etc.).

The one or more trends may additionally include transaction volume trends that may indicate whether certain cryptocurrency exchanges experience a higher volume of purchase and/or sell transactions for the particular cryptocurrency relative to other cryptocurrency exchanges. The one or more trends may also include demand stability trends for the plurality of cryptocurrency exchanges. For example, a demand stability trend may indicate a frequency in which the daily volume of purchase and/or sell transactions for a particular cryptocurrency at a particular cryptocurrency exchange deviates from the average volume at the particular cryptocurrency exchange and/or an average volume across two or more cryptocurrency exchanges. Such information may provide an indication of how volatile a particular cryptocurrency is and whether it is more volatile at certain cryptocurrency exchanges than others, which may provide an indication of the money transfer service provider's risk of loss when utilizing cryptocurrencies and/or cryptocurrency exchanges to facilitate money transfer transactions. For example, when the demand to purchase a cryptocurrency is higher than the demand to sell the cryptocurrency, the price of the cryptocurrency typically increases; when the demand to purchase a cryptocurrency is approximately equal to the demand to sell the cryptocurrency, the price of the cryptocurrency typically remains flat; and when the demand to purchase a cryptocurrency is lower than the demand to sell the cryptocurrency, the price of the cryptocurrency typically decreases. It may be more difficult to accurately forecast future changes (e.g., price changes, demand, etc.) for cryptocurrencies and/or cryptocurrency exchanges that frequently experience significant deviations in transaction volume, and cryptocurrencies and/or cryptocurrency exchanges that exhibit such characteristics may be identified as posing a higher risk than cryptocurrencies and/or cryptocurrency exchanges that do not experience such significant deviations. Additionally, cryptocurrencies and/or cryptocurrency exchanges that exhibit patterns of high volatility may subject the money transfer service provider to increased risk of loss (e.g., if quantities of cryptocurrencies held by the money transfer service provider exceed actual demand). It is noted that the exemplary demand stability trend described above has been provided for purposes of illustration, rather than by way of limitation, and that money transfer networks configured in accordance with the present disclosure may utilize additional stability trends. Based on the analysis of the various trends described above, the forecasting module may generate a risk of loss forecast that includes risk metrics for one or more cryptocurrencies and/or cryptocurrency exchanges. The risk metrics may categorize the one or more cryptocurrencies and/or cryptocurrency exchanges into various risk categories (e.g., high risk, low risk, risk neutral).

The various trends may be evaluated against the risk metrics when determining whether to initiate a purchase of a quantity of cryptocurrency in excess of current demand. For example, as described above, the transaction management module (or the rules engine) may purchase a first quantity of a first cryptocurrency and a second quantity of a second cryptocurrency based on transaction demand forecasts. It is noted that the forecasting module may be configured to periodically update (e.g., hourly, once every 3 days, once a week, once every two weeks, once a month, etc.) the predicted demand (e.g., the forecasted demand) and reevaluate the days included in the first set of days and second set of days, which may enable the money transfer network to account for changes in transaction demand over time.

In an aspect, one or more risk mitigation procedures may be initiated to reduce risk in connection with purchasing the quantities of the first cryptocurrency and the second cryptocurrency based on an evaluation of transaction demand forecasts against the risk metrics generated by the forecasting module. To illustrate, transaction demand forecasts may indicate an aggregate value of money transfer transactions expected to utilize a particular cryptocurrency during a period of time (e.g., a day) as described above. A transaction demand forecast for a cryptocurrency may be evaluated against an average historical demand for the cryptocurrency to determine whether forecasted demand matches the historical demand to within a threshold tolerance. The threshold tolerance may be defined as a percentage, such as 15%, and evaluating the transaction demand forecast against the average demand may determine whether the forecasted demand is within at least 15% of the average demand. For example, if the forecasted demand was $85,000 and the average demand was $100,000, the forecasted demand may be determined to be within the threshold tolerance. The transaction management module may implement one or more risk mitigation procedures based on whether the forecasted demand is within the threshold tolerance. For example, where the forecasted demand is greater than the average demand, the transaction management module may execute the purchase of the quantity of cryptocurrency based on the forecasted demand. If the forecasted demand is within the threshold tolerance of the average demand (e.g., the forecasted demand is between 85% and 100% of the average demand), the transaction management module may execute the purchase of the quantity of cryptocurrency, but may reduce the quantity purchased to below the forecasted quantity. For example, if the forecasted demand was 87% of the average demand, the transaction management module may purchase a quantity of cryptocurrency sufficient to satisfy 87% of the forecasted demand, or the purchased quantity may be reduced by greater amount, such as 25% (e.g., the transaction management module purchases quantity of cryptocurrency sufficient to satisfy 75% of the forecasted demand). If the forecasted demand is not within the threshold tolerance of the average demand (e.g., the forecasted demand is between below 85% of the average demand), the transaction management module may execute the purchase of the quantity of cryptocurrency, but may reduce the significantly reduce quantity purchased, such as to purchase 50% or less of the forecasted demand, or may forego purchasing the quantity of cryptocurrency in advance of receiving money transfer transaction requests.

In an aspect, the transaction management module (or the rules engine) may evaluate the risk of loss forecast information when determining whether to purchase quantities of cryptocurrency in excess of current demand. For example, where the forecasted demand exceeds the average demand, the risk of loss forecast may be analyzed to determine one or more risk metrics associated with the particular cryptocurrency under consideration. If the risk metric indicates high risk, the transaction management module may execute a purchase of a quantity of cryptocurrency, but the purchased quantity may be less than the forecasted demand. If the risk metric indicates low risk or neutral risk, the transaction management module may execute the purchase of the quantity of cryptocurrency in accordance with the forecasted demand.

It is noted that the particular threshold values described above have been provided for purposes of illustration, rather than by way of limitation, and the other values may be utilized by a money transfer network in accordance with the present disclosure. Additionally, the threshold values may be periodically evaluated against performance of the money transfer network and adjusted to optimize one or more aspects of the money transfer network. For example, a component of the central server 110, such as the monitoring module, the transaction management module, or the forecasting module, may be configured to analyze past purchases of cryptocurrency based on forecasted demand to evaluate the effectiveness of the quantities purchased. The evaluation of the effectiveness may include comparing the quantity of cryptocurrency purchased to the quantity of cryptocurrency actually used to facilitate money transfer transactions during a period of time corresponding to the forecasted demand to determine a difference between the purchased quantity of cryptocurrency and the quantity of cryptocurrency used to facilitate money transfer transactions during the period of time. The differences determined for each cryptocurrency may be stored in the one or more databases 118, such as in a risk mitigation database. Additionally, the purchased quantity and the forecasted demand may also be recorded.

Over time, the information recorded in the risk mitigation database may indicate an effectiveness of the reductions applied to the forecasted demand when purchasing quantities of cryptocurrency. For example, the information may indicate that a reduction applied to a forecasted demand with respect to a first cryptocurrency consistently results in purchasing an excess quantity of the first cryptocurrency and a reduction applied to a forecasted demand with respect to a second cryptocurrency results in purchasing a deficient quantity of the second cryptocurrency. When a reduction consistently results in an excess quantity of cryptocurrency, the reduction may be determined as ineffective (e.g., because the excess quantity of cryptocurrency exposes the money transfer service provider to a risk of loss due) and the reduction may be adjusted to reduce the quantity of cryptocurrency purchased, such as by increasing the amount of the reduction so that future purchases of the cryptocurrency are less likely to result in excess cryptocurrency for the corresponding period of time. When a reduction consistently results in a deficient quantity of cryptocurrency, the reduction may be determined as effective (e.g., because the risk of loss is mitigated due to the purchased quantity being consistently lower than actual demand). A reduction may be adjusted despite being evaluated as effective, such as to reduce the deficiency in the quantity of cryptocurrency purchased, which may reduce the number of money transfer transactions that require additional quantities of the cryptocurrency to be purchased and improve the speed at which those money transfer transactions may be executed.

Figure 5:
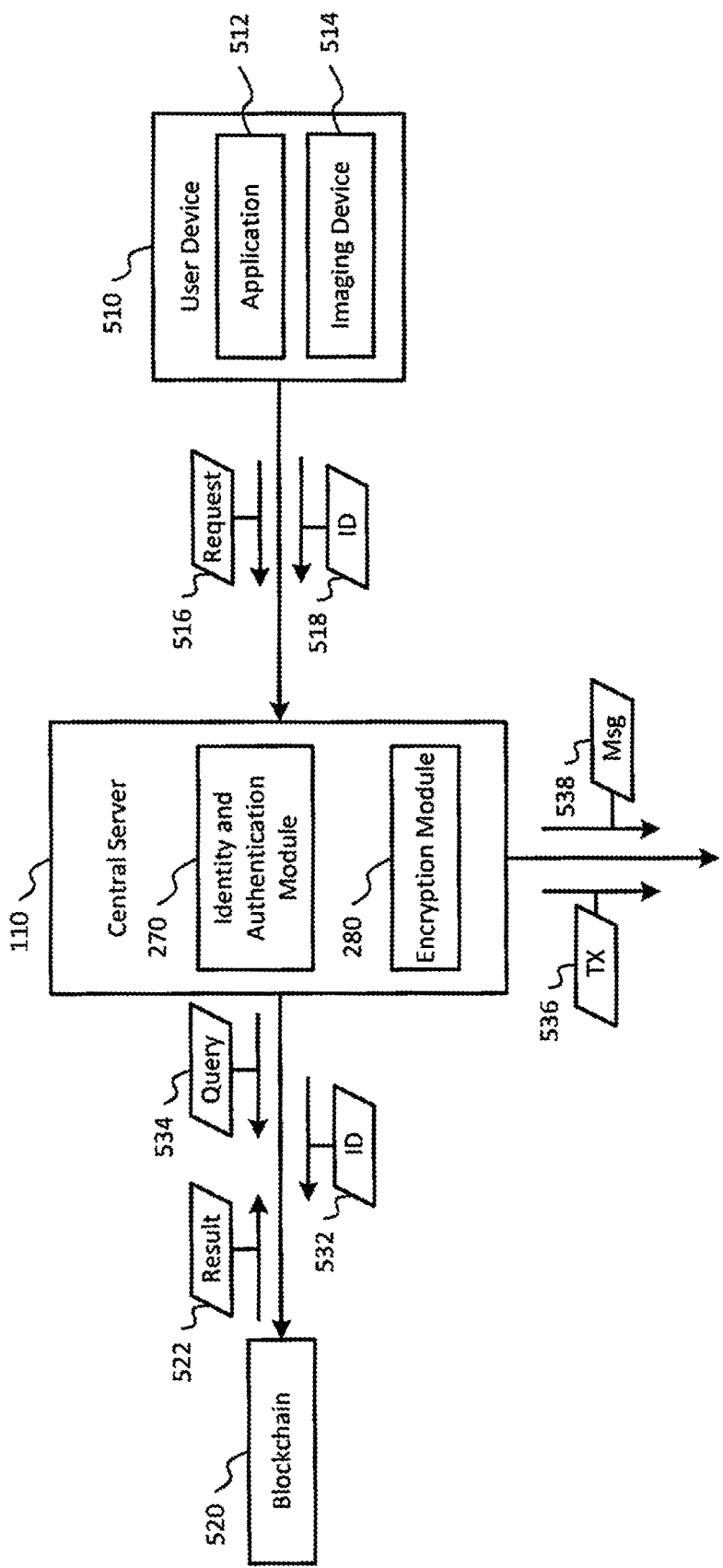
FIG. 5 is a block diagram illustrating aspects of blockchain-based user authentication techniques for providing money transfer transactions in accordance with embodiments of the present disclosure.

The central server 110 may include an identity and authentication module (e.g., the identity and authentication module 270 of FIG. 2) configured to provide functionality and supporting infrastructure for authenticating user identities in connection with money transfer transactions facilitated by the system 100. For example, and referring to FIG. 5, a block diagram illustrating aspects of blockchain-based user authentication techniques for providing money transfer transactions in accordance with embodiments of the present disclosure is shown. In FIG. 5, the central server 110 of FIG. 1, the identity and authentication module 270 of FIG. 2, and the encryption module 280 of FIG. 2 are shown. The identity and authentication module 270 and the encryption module 280 may be configured to read and write identity information to a private blockchain 520 maintained by the money transfer service provider. The blockchain 520 may be implemented using IBM's hyperledger, or may be implemented on another blockchain platform.

As shown in FIG. 5, a user, such as a person desiring to participate in a money transfer transaction, may operate an electronic device, shown in FIG. 5 as user device 510. The user device 510 may be a smartphone, a personal computer, a tablet computing device, a user directed device, such as the kiosk 150 of FIG. 1, or another device. The user device 510 includes an application 512 and an imaging device 514. The application 512 may be an application installed on user device 510, such as an application available from Apple Inc.'s APPSTORE or another application distribution channel, or may be a browser-based application adapted for presentation via a web browser executing on the user device 510. The imaging device 514 may be digital camera or video camera configured to capture image or video data.

During registration of the user with the money transfer service provider, the application 510 may present various GUIs prompting the user for information to set up an account with the money transfer service provider. As part of the account setup process, the user may be prompted to provide one or more images, such as a picture of the user's face and/or one or more image of a form of identification, such as images of a front and back of the user's driver's license or other form of acceptable identification (e.g., a passport). Additionally, biometric information may be captured for the user, such as fingerprints, retina scans, palm/handprint scans, and the like. The particular types of biometric information may vary depending on the type of device being utilized by the user. For example, if the user is setting up the account or requesting a money transfer transaction from the user's mobile communication device, a fingerprint scan may be utilized (e.g., using a fingerprint scanning capability of the user's mobile device), and if a kiosk is being used, additional biometric information may be captured, such as retina scans, handprint scans, etc. The information input by the user during the account setup process may be transmitted to the central server 110 as identification message 518 where it is detected by the identity and authentication module 270. The identity and authentication module 270 may validate that all required information has been provided, and may utilize image processing techniques, such as facial recognition software, to verify that the images of the user and/or the provided images of the form of identification depict the same person. Once all of the information included in the identification message 518 has been verified as both present and correct, the encryption module 280 may encrypt the contents of the identification message 518 to produce an encrypted identification message 532. The encrypted identification message 532 may be written to the blockchain 520 maintained by the money transfer service provider.

Subsequently, the registered user may submit a request 516 to initiate a money transfer transaction. During configuration of the request 516, the application 512 may control the imaging device 514 to capture an image of the user's face, biometric information (e.g., fingerprints, eye scans, facial recognition information, palm scans, and the like), images of one or more types of identification, and the like, and the images may be included in the request 516. Upon receiving the request 516, the central server 110 may submit a query 534 to the blockchain 520, where the query 534 is configured to retrieve at least a portion of the identification information provided by the user during the registration process. As a result of the query 534, a result 522 may be received and validated against the contents of the request 516. For example, the encryption module 280 may decrypt the result 522 to produce decrypted identification information. The decrypted identification information may be compared to the identification information included in the request 516 to verify the images of the user's face and/or government identification at the time the request 516 was configured matches one or more images captured from the user providing when the user registered with the money transfer service provider (e.g., during configuration of identification message 518). Upon successful validation of the user's identity, the central server 110 may initiate the money transfer transaction based on the configuration of the request 516. For example, a transaction 536 to purchase a quantity of cryptocurrency as part of a send transaction may be executed and a notification message 538 may be transmitted to a receiving party. The notification message 538 may be an e-mail message, a text message, a push notification, an AVR message, or some other form of notification and may include instructions for initiating a receive transaction by the receiving party. It is noted that the send transaction and receive transaction described above with reference to FIG. 5 may involve aspects of the processes described above with respect to FIGS. 1-4, and have not been repeated here to streamline the disclosure.

The techniques described above with reference to FIG. 5 may facilitate more secure money transfer transactions. For example, the identification information written to blockchain 520 may provide immutable records of information that may be used to confirm the identity of participants to money transfer transactions. Additionally, image information included in each transaction request may be validated against image information included in the immutable identity records stored in blockchain 520 to validate the identity of a participant to a money transfer transaction. Thus, every money transfer transaction may be validated against a government identification verified image, as well as biometric information of the participant, which may increase the money transfer service provider's ability to satisfy one or more regulatory requirements. It is noted that although FIG. 5 has been described primarily with respect to a money transfer transaction from the sending party perspective, the concepts and techniques disclosed herein may also be implemented to validate the identity of a receiving party. Further, aspects of the techniques illustrated in FIG. 5 may be implemented from an agent device, such as the agent device 130 of FIG. 1, or may be implemented by a user directed device, such as the kiosk 150 of FIG. 1.

Figure 6:
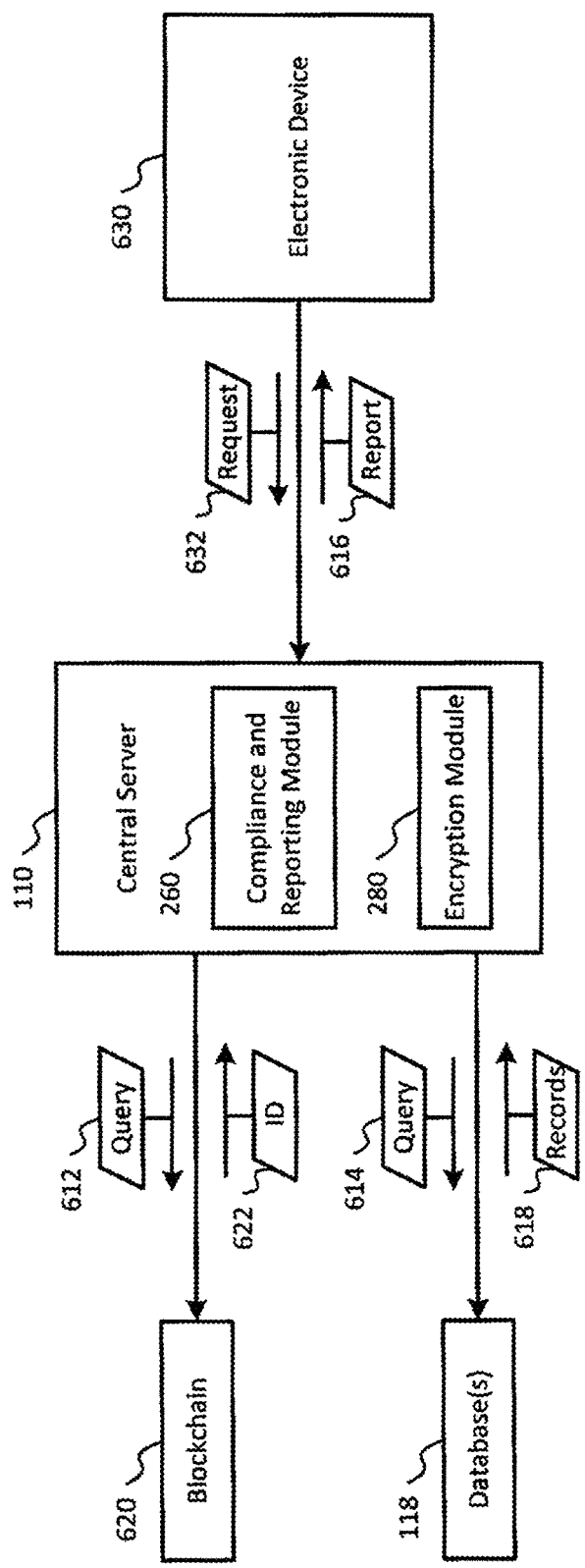
FIG. 6 is a block diagram illustrating techniques for establishing regulatory compliance of money transfer transactions performed in accordance with the present disclosure.

Referring back to FIG. 1, the central server 110 may include a compliance and reporting module (e.g., the compliance and reporting module 260 of FIG. 2) configured to monitor operational aspects of system 100 for regulatory compliance and to generate reports designed to prove up compliance of money transfers facilitated by system 100. To illustrate, and referring to FIG. 6, a block diagram illustrating techniques for establishing regulatory compliance of money transfer transactions performed in accordance with the present disclosure is shown. In FIG. 6, the central server 110 of FIG. 1, the one or more databases 118 of FIG. 1, the compliance and reporting module 260 of FIG. 2, the encryption module 280 of FIG. 2, and the blockchain 520 of FIG. 5 are shown. Additionally, FIG. 6 illustrates an electronic device 630. The electronic device 630 may be an electronic device associated with an agency that imposes one or more regulations on the money transfer service provider, such as the Office of Foreign Assets Control (OFAC), or may be an electronic device associated with the money transfer service provider, such as a computing device associated with a regulatory compliance department of the money transfer service provider.

As shown in FIG. 6, the electronic device 630 may transmit a request 632 to the central server 110. The request 632 may be a request to prove up regulatory compliance with respect to one or more money transfer transactions. The one or more money transfer transactions may be identified based on a time period (e.g., a request to prove up regulatory compliance for a particular week, month, day, etc.), based on a particular type of money transfer transaction (e.g., a request to prove up regulatory compliance for money transfer transactions facilitated using cryptocurrency as opposed to using fiat currency), based on corridor (e.g., a request to prove up regulatory compliance for money transfer transactions between a first location and a second location), or another technique for identifying money transfer transactions. The request 632 may be received by the compliance and reporting module 260. In response to receiving the request 632, the compliance and reporting module 260 may create a query 614 configured to identify money transfer transactions relevant to the request 632 from the one or more databases 118. For example, the query 614 may be configured to audit the transaction database for information that identifies the relevant money transfer transactions. As a response to the query 614, the compliance and reporting module 260 may receive records 618 corresponding to the relevant money transfer transactions. The compliance and reporting module 260 may identify the parties to the relevant money transfer transactions based on the records 618, and may utilize a query 612 to retrieve identification information associated with the identified parties from the blockchain 520.

After identifying the relevant money transfer transactions and the parties involved in those transactions, the compliance and reporting module 260 may generate a report 616 responsive to the request 632. The report 616 may include information that identifies the parties, which may involve decrypting the identification information retrieved from the blockchain 520, as well as information that identifies each relevant money transfer transaction, the send amounts, the blockchain records associated with various cryptocurrency transactions utilized to provide the money transfer transactions, and the like. The system 100 may provide detailed reports that provide trustworthy evidence of regulatory compliance than if traditional money transfer transactions were provided. For example, the immutable records generated by blockchain technologies may be independently verified by third parties for accuracy. Additionally, the likelihood that money transfer transactions are in compliance with various regulatory requirements is significantly increased by utilizing verified government and biometric identities, as described with reference to FIG. 5.

Referring back to FIG. 1, in an aspect, the system 100 may be configured to execute money transfer transactions in an asynchronous manner with respect to transactions to buy and sell cryptocurrency. The money transfer service provider operating central server 110 may establish agreements with financial institutions, such as banks, in one or more corridors that facilitate real time or near real time funding of money transfer transactions independent of how long it takes to complete a purchase and/or sell transaction with respect to a quantity of cryptocurrency. To illustrate, the money transfer service provider and financial institutions may establish smart contracts on a blockchain (e.g., a private blockchain, such as blockchain 520 of FIG. 5 or another blockchain maintained by the money transfer service provider or the financial institution, or a third party blockchain, such as the Ethereum blockchain or the Ripple blockchain). When a money transfer transaction request is received and authorized for execution, the money transfer service provider may instantiate an instance of the smart contract, which may initiate a payment of funds by the financial institution corresponding to the smart contract. The funds provided by the financial institution may be used to fund the receive transaction. For example, the funds provided by the financial institution may be equal to the receive amount and the financial institution may provide the funds to the receiving party directly, such as via an electronic deposit to a bank account of the receiving party or to a prepaid financial card associated with the receiving party. The bank account information or the prepaid financial card information (e.g., the account for loading the funds onto the prepaid financial card) may be provided to the bank via the smart contract. Alternatively, the financial institution may deposit the funds into an account of the money transfer service provider, such as a bank account of a money transfer agent that will fund the receive transaction or a bank account of the money transfer service provider. In this scenario, the receiving party may receive the funds by visiting a money transfer agent location or via a kiosk or ATM. Where the receiving party is to receive the funds via an ATM, the receiving party may receive a code that may be typed into a keypad of the ATM to receive the funds, or the receiving party may swipe a financial card (e.g., a prepaid financial card, a debit card, a credit card, and the like) in a financial card reader of the ATM or kiosk to receive the funds. It is noted that the financial card may be issued by the financial institution, or may be issued by another financial institution, and information identifying the financial card may be specified in the smart contract or provided via an interface of the ATM or kiosk. In this manner, the receiving party may use any financial card to withdraw the receive amount from an ATM or kiosk device.

The money transfer service provider may initiate a purchase transaction and/or a sales transaction with respect to a quantity of cryptocurrency and may provide the proceeds of the sale to the financial institution as reimbursement for the funds utilized to fund the receive transaction. In an aspect, the purchase and/or sales transaction may be automatically executed via the smart contract. For example, the smart contract may include instructions that, upon instantiating the smart contract, implement one or more of the exemplary techniques for selecting, purchasing, and/or selling quantities of cryptocurrency to provide money transfer transactions disclosed herein. This may enable aggregation techniques to be utilized without incurring delays, such as delays associated with waiting for enough money transfer transactions to be requested to purchase a large quantity of cryptocurrency and delays associated with withdrawing funds from a cryptocurrency exchange following the sale of cryptocurrency, each of which may delay the money transfer service provider's ability to fund the receive transaction.

As shown above, aspects of the present disclosure illustrate various techniques for providing a money transfer network that utilizes various cryptocurrency and blockchain transactions to facilitate money transfer transactions. Money transfer networks configured in accordance with the present disclosure provide improvements over existing money transfer networks. For example, existing money transfer networks, which rely on traditional banking networks and electronic funds transfer to move funds between a money transfer location where a send transaction is performed and a money transfer location where a receive transaction is performed, may take hours or even days to complete and could result in significant delays between funding a money transfer transaction and providing funds to the receiving party. In contrast, a money transfer network configured in accordance with the present disclosure execute money transfer transactions using blockchain transactions, which may facilitate transfers of value between the money transfer location where the send transaction is performed and the money transfer location where the receive transaction is performed in a matter of minutes or even seconds. Further, a money transfer network in accordance with the present disclosure may provide improved regulatory compliance by recording government identification card and biometric identity verification in immutable records recorded on a blockchain and using the immutable records to authenticate participants to money transfer transactions, especially with respect to user directed devices. Accordingly, aspects of the present disclosure provide new processes and techniques for providing money transfer networks that improve upon existing money transfer network processes and result in improved transaction speeds and security.

Figure 7:
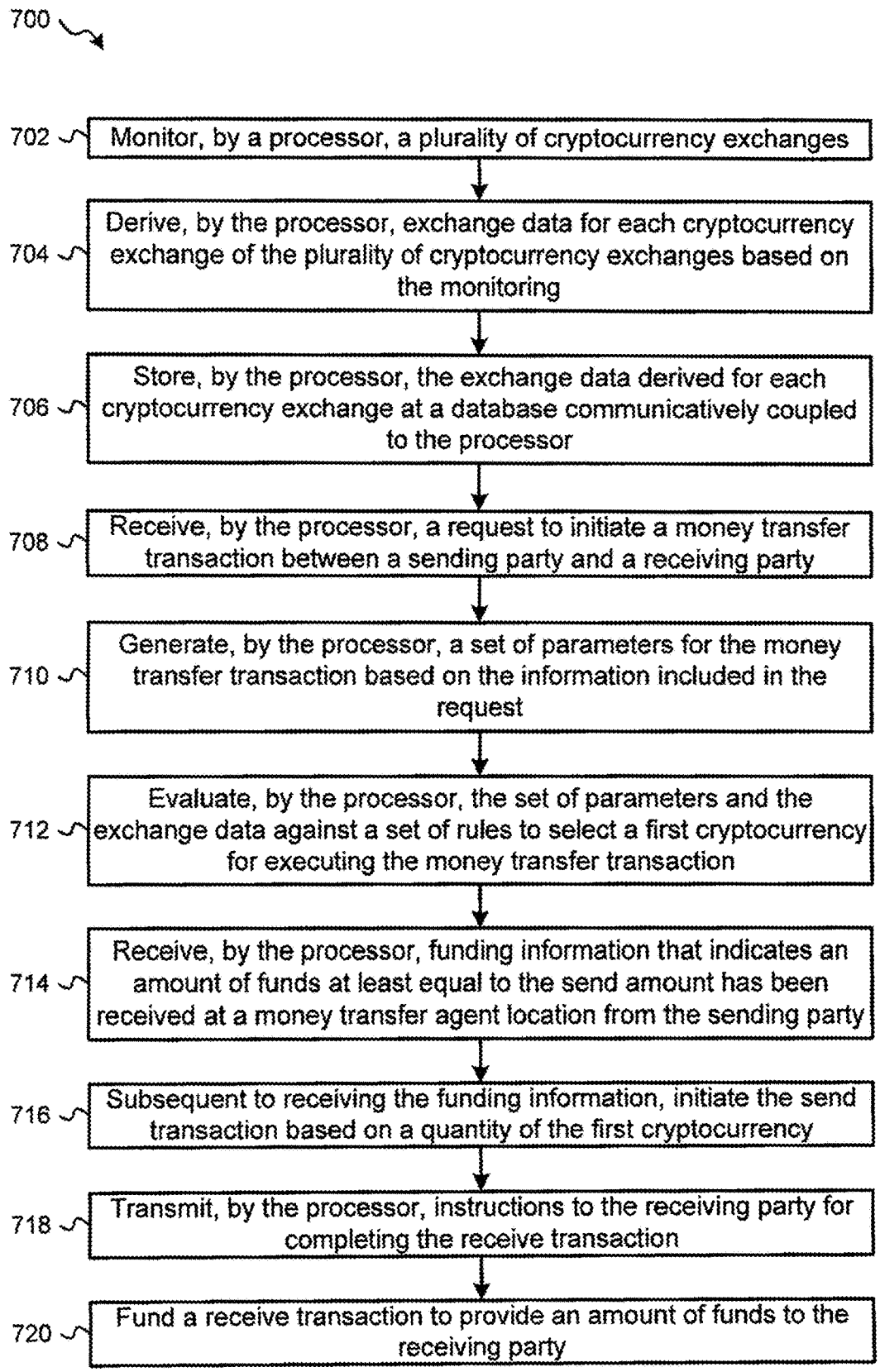
FIG. 7 is a flow diagram of an exemplary method for providing blockchain-based money transfer transactions in accordance with embodiments of the present disclosure.

Referring to FIG. 7, a flow diagram of an exemplary method for providing blockchain-based money transfer transactions in accordance with embodiments of the present disclosure is shown as a method 700. In an aspect, the method 700 may be stored as instructions that, when executed by one or more processors, cause the one or more processors to perform operations for providing blockchain-based money transfer transactions in accordance with embodiments. For example, the method 700 may be stored as the instructions 116 of FIG. 1, and may be executed by the one or more processors 112 of the central server 110. Additionally, at least a portion of the method 700 may be stored as the instructions executable by one or more processors of an agent device, such as the instructions 136 executable by the one or more processors 132 of the agent device 130 of FIG. 1 or the instructions 156 executable by the one or more processors 152 of the agent device 150 of FIG. 1. Further, it is noted that portions of the method 700 may be performed by different device and/or computing resource arrangements. For example, the method 700 may be implemented in a client-server architecture where an agent device and one or more central servers coordinate processing of different aspects of initiated money transfer transactions. As another example, the method 700 may be performed by a set of computing resources (e.g., processors, memory, network communication capabilities, etc.) disposed on a network, such as in a cloud-based system configuration. Accordingly, the method 400 may be adapted for execution by a plurality of different system architectures and computing resource arrangements.

At step 702, the method 700 includes monitoring, by a processor, a plurality of cryptocurrency exchanges. The cryptocurrency exchanges may be monitored using a monitoring module, such as the monitoring module 210 described above with reference to FIGS. 1 and 2. At step 704, the method 700 includes deriving, by the processor, exchange data for each cryptocurrency exchange of the plurality of cryptocurrency exchanges based on the monitoring, and, at step 706, storing, by the processor, the exchange data derived for each cryptocurrency exchange at a database communicatively coupled to the processor. As described above with reference to FIGS. 1 and 2, the monitoring module may derive various types of information (e.g., trends, metrics, historical data, and the like) about one or more cryptocurrencies and/or cryptocurrency exchanges based on the monitoring.

At step 708, the method 700 includes receiving, by the processor, a request to initiate a money transfer transaction between a sending party and a receiving party. The money transfer transaction may include a send transaction and a receive transaction, and the request may include information that identifies at least the sending party, the receiving party, and a send amount, but may also include additional information, such as information included in configured money transfer transaction requests described above with reference to FIGS. 1-6. At step 710, the method 700 includes generating, by the processor, a set of parameters for the money transfer transaction based on the information included in the request. The set of parameters may be generated as described above with reference to FIG. 1. At step 712, the method 700 includes evaluating, by the processor, the set of parameters and the exchange data against a set of rules to select a first cryptocurrency for executing the money transfer transaction. The evaluation of the set of parameters and the exchange data against the set of rules may utilize a rules engine, such as the rules engine 230, as described above with reference to FIG. 1. The first cryptocurrency may be available via at least one of the plurality of exchanges.

The method 700 includes, at step 714, receiving, by the processor, funding information that indicates an amount of funds at least equal to the send amount has been received at a money transfer agent location from the sending party, and at step 716, initiating the send transaction based on a quantity of the first cryptocurrency. The send transaction may be initiated subsequent to receiving the funding information, and a value of the quantity of the first cryptocurrency may correspond to the send amount. At step 718, the method 700 includes transmitting, by the processor, instructions to the receiving party for completing the receive transaction, wherein the receive transaction is funded using the quantity of the first cryptocurrency, and at 720, funding a receive transaction to provide an amount of funds to the receiving party. As described hereinabove, the receive transaction may be funded via the sale of cryptocurrency, and a variety of different techniques for purchasing and selling cryptocurrencies to facilitate money transfer transactions may be provided.

EXAMPLES

As part of the present disclosure, examples are described below to provide examples of specific use cases for providing money transfer transactions via a money transfer network in accordance with embodiments of the present disclosure. These examples are provided for purposes of illustration, rather than by way of limitation, and those of ordinary skill in the art will readily recognize that specific details of the examples below could be changed or modified to facilitate additional use cases that implement the concepts disclosed herein. Further, it is noted that although the examples described below may demonstrate different aspects of providing a money transfer network in accordance with the present disclosure, those of ordinary skill in the art will readily recognize that exemplary aspects of any particular example may be readily applied to other examples as well as the concepts described with respect to FIGS. 1-7.

Example 1

Example 1 Describes a Use Case for Providing a Money Transfer Transaction Using a Single Cryptocurrency In Example 1, a sending party may configure a request for a money transfer transaction. As described above, the sending party may configure the request in several different ways. For example, the sending party may configure the request via a user directed device, such as by providing inputs to a GUI presented by an application running on the sending party's smartphone, a web browser, a kiosk, and the like. The sending party may also configure the request by visiting a money transfer agent location and interacting with a money transfer agent who configures the request by providing inputs to a GUI presented by an application running an agent directed device, such as a POS, a laptop computing device, a desktop computing device, a tablet computing device, and the like. Additionally, the request may be configured using both user directed devices and agent directed devices. For example, the sending party may stage the money transfer transaction by configuring at least a portion of the request via a user directed devices and then visit a money transfer agent location to finalize and initiate the money transfer transaction (e.g., the money transfer agent may access the staged request via an agent directed device, verify the sending party's identity and the information included in the stage request, provide any additional information or changes, etc.).

Once the request is configured or as part of configuration process, the sending party may fund the money transfer transaction. The sending party may fund the money transfer transaction in a variety of ways. For example, the sending party may fund the money transfer transaction by providing payment information (e.g., financial card information, bank account information, and the like) that may be used by the money transfer service provider to charge a funding amount to an account of the sending party. The sending party may also fund the money transfer transaction by providing an amount of fiat currency to a money transfer agent or a currency receptacle (e.g., a currency receptacle of a kiosk or ATM) or by sending an amount of cryptocurrency having a value equal to the funding amount to a crypto-wallet of the money transfer service provider or money transfer agent at a particular exchange. The funding amount may include a first amount of funds corresponding to a send amount (e.g., the amount of funds to be sent to the receiving party) and a second amount of funds corresponding to a fee charged by the money transfer service provider for facilitating the money transfer transaction.

After the configured request is received, the requested money transfer transaction may be verified for regulatory compliance (e.g., by the compliance and reporting module 260 of FIG. 2). Verification of the request for regulatory compliance may include verifying the identity of the sending party, which may include validating identity information included in the request against identity information recorded on a blockchain by the money transfer service provider as described with reference to FIGS. 5 and 6. The verification process may also include validating compliance with one or more regulatory requirements, such as to verify that: the sending party and receiving party are not identified on a watch list maintained by a government entity, such as OFAC; the funding amount would not exceed a maximum amount of funds that the sending party may transfer via money transfer transactions within a defined time period in accordance with one or more regulatory requirements; money transfer transactions to the location of the receiving party are not restricted; and/or other regulatory requirements. Additionally, the verification process may include validating compliance with one or more restrictions imposed by the money transfer service provider.

After the request has been verified as compliant with respect to regulatory compliance and the funding amount has been received, the money transfer network (e.g., the money transfer network illustrated in FIGS. 1-7, may initiate operations to execute a send transaction. In Example 1, the send transaction may be executed via a purchase of a quantity of a first cryptocurrency from a first cryptocurrency exchange. For example, a transaction management module may purchase a quantity of Bitcoin from Coinbase, where the quantity of Bitcoin purchased has value equal to the send amount. As explained above, the particular cryptocurrency that is purchased may be determined by executing various analytics and rules against parameters of the money transfer transaction request, which may include identifying a corridor for the money transfer transaction, identifying cryptocurrencies available at each end of the corridor (e.g., the sending party location and the receiving party location), analyzing the available cryptocurrencies to identify an optimum cryptocurrency (e.g., a cryptocurrency that has high demand at the receive end of the corridor, minimizes a risk of loss in value, etc.), selecting one or more cryptocurrency exchanges for executing the money transfer transaction, and the like. After purchasing the quantity of the first cryptocurrency, the money transfer network may initiate a transfer of the quantity of the first cryptocurrency to a second exchange, such as Binance. The transfer process may include sending the first quantity of the first cryptocurrency from a first crypto-wallet (e.g., a crypto-wallet at the first cryptocurrency exchange) to a second crypto-wallet (e.g., a crypto-wallet at the second cryptocurrency exchange).

Once the transfer is completed, the transaction management module may sell the first quantity of cryptocurrency at the second exchange and withdraw the proceeds of the sale to fund the receive transaction. Funding the receive transaction may provide the funds to the receiving party immediately. For example, the sale and withdrawal may occur prior to the receiving party visiting a money transfer agent location or accessing a user directed device to initiate the receive transaction (e.g., to receive the receive amount). It is noted that the receive transaction may include verification processes similar to the verification processes described above, such as validating the receiving party's identity using identity information received from the receiving party at the time the receive transaction is to be executed against identity information recorded on a blockchain, as described above with reference to FIGS. 5 and 6. Once the verification process has been completed and the receive transaction is authorized, the funds may be provided to the receiving party.

Example 2

Example 2 Describes a Use Case for Providing a Money Transfer Transaction Using Multiple Cryptocurrencies In Example 2, a sending party may configure a money transfer transaction request using various aspects of the techniques disclosed herein, as described above with reference to Example 1. As described above, the received request may be validated and the funding amount may be received. Upon authorizing the requested money transfer transaction, the transaction management module may determine one or more cryptocurrencies for providing the money transfer transaction, such as using the rules engine, exchange data, and forecast data, as described above. In this example, a first cryptocurrency and a second cryptocurrency may be identified by the transaction management module, where the first cryptocurrency is to be utilized for executing the send transaction and the second cryptocurrency is to be utilized for executing the receive transaction.

Two cryptocurrencies may be identified due to different cryptocurrencies being available at the send and receive ends of the corridor, such as where a cryptocurrency exchange at the sending party location (e.g., in the United States) does not include at least one cryptocurrency available at a cryptocurrency exchange at the receiving party location (e.g., in Mexico). As another example, two cryptocurrencies may be identified based on demand metrics associated with the receiving party location and the sending party location, such as where cryptocurrencies available at cryptocurrency exchanges associated with the sending party location have low demand at cryptocurrencies available at cryptocurrency exchanges associated with the sending party location. Additionally, two or more cryptocurrencies may be identified based on quantities of one or more cryptocurrencies held in crypto-wallets associated with cryptocurrency exchanges serving the sending party location and the receiving party location. For example, if a crypto-wallet associated with a cryptocurrency exchange serving the receiving party location may hold an excess quantity of a particular cryptocurrency. Rather than sending an additional quantity of the particular cryptocurrency from the cryptocurrency exchange associated with the sending party location to the cryptocurrency exchange associated with the receiving party location, a portion of the excess quantity of cryptocurrency at the exchange associated with the receiving party location may be sold. In such a scenario, the quantity of the first cryptocurrency purchased to facilitate the send transaction may correspond to a cryptocurrency for which the corresponding crypto-wallet at the cryptocurrency exchange associated with the receiving party location is deficient. As a result, the send transaction may be used to purchase and transfer a quantity of the deficient cryptocurrency to the crypto-wallet cryptocurrency exchange associated with the receiving party location and the receive transaction may be used to reduce the quantity of excess quantity cryptocurrency held at cryptocurrency exchange associated with the receiving party.

Once the two cryptocurrencies and cryptocurrency exchanges are identified, the transaction management module may initiate a purchase of a quantity of the first cryptocurrency from a first cryptocurrency exchange (e.g., a cryptocurrency exchange associated with the sending party location) and may initiate a sell transaction of a quantity of the second cryptocurrency from a second cryptocurrency exchange (e.g., a cryptocurrency exchange associated with the receiving party location). Proceeds from the sales transaction may be used to fund the receive transaction following validation/verification of the receiving party's identity, as described above. Thus, whereas Example 1 facilitated a money transfer transaction utilizing a single cryptocurrency, Example 2 illustrates a use case where multiple cryptocurrencies are utilized to facilitate a single money transfer transaction.

Example 3

Example 3 Describes a Use Case for Providing Money Transfer Transactions Using Aggregation Techniques In Example 3, a plurality of sending parties may configure money transfer transaction requests using various aspects of the techniques disclosed herein, as described above with reference to Example 1. As described above, the received requests may be validated and the funding amounts may be received. Upon authorizing the requested money transfer transactions, the aggregation module and the transaction management module may coordinate operations to select particular cryptocurrencies for each of the received requests, and aggregate the requests into different groups, each group corresponding to a particular cryptocurrency. Once the different groups are identified, aggregate send amounts may be determined and quantities of cryptocurrency may be purchased for each group, as described above with reference to FIG. 3. It is noted that different cryptocurrencies may be purchased from different exchanges (e.g., to take advantage of volume purchase discounts offered by some cryptocurrency exchanges).

As described above with reference to FIG. 4, once the aggregate quantities of cryptocurrency are purchased, the transaction management module may distribute portions of the aggregate quantities of each cryptocurrency to one or more additional cryptocurrency exchanges. For example, corridors associated with each of the aggregated money transfer transaction requests may be identified and portions of the aggregate quantities of cryptocurrency may be transferred to cryptocurrency exchanges associated with receive ends of the identified corridors to fund the receive transaction. It is noted that aggregation techniques may take into account any excess and deficient quantities of cryptocurrency held in crypto-wallets associated with the money transfer network, such as to reduce the aggregate quantity of cryptocurrency purchased where excess quantities are on hand (e.g., because the excess quantities may be transferred to other crypto-wallets/corridors where applicable), and to increase the aggregate quantity of cryptocurrency purchased where deficient quantities are identified, as described above with respect to FIG. 2. Once the quantities of cryptocurrency are distributed to the appropriate cryptocurrency exchanges, sell transactions and withdrawal transactions may be initiated, and proceeds of the sell transactions may be used to fund receive transactions following verification of the receiving party's identity, etc. Thus, whereas Examples 1 and 2 initiated cryptocurrency transactions for a single money transfer transaction, Example 3 illustrates a use case where multiple money transfer transactions are aggregated together prior to acquiring the cryptocurrencies that are to be utilized to execute the money transfer transactions.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, performed by a set of computing resources disposed on a network, for conducting a money transfer request by evaluating a plurality of cryptocurrency exchanges, the method comprising:
configuring a request for a money transfer via a computer interface;
funding the money transfer request;
verifying the money transfer request with regulatory compliance rules;
selecting a first cryptocurrency exchange and a second cryptocurrency exchange by
crawling websites corresponding to the plurality of cryptocurrency exchanges by at least one autonomous bot in order to monitor and store volatility data for a plurality of cryptocurrency exchanges;
analyzing the stored volatility data to generate one or more risk forecasts indicating risks associated with purchasing cryptocurrency through each of the cryptocurrency exchanges;
determining a first transaction factor indicating a loss forecast based on the one or more risk forecasts;
determining a second transaction factor indicating a time to complete a cryptocurrency transaction for each of the cryptocurrency exchange in the plurality of cryptocurrency exchanges;
determining a third transaction factor indicating costs required to complete a cryptocurrency transaction for each of the cryptocurrency exchange in the plurality of cryptocurrency exchanges;
weighting the first, second, and third transaction factor according to a predetermined amount;
selecting the first cryptocurrency exchange based on the weighted first, second, and third transaction factors; and
selecting the second cryptocurrency exchange based on the weighted first, second, and third transaction factors;
purchasing a first quantity of cryptocurrency from the first cryptocurrency exchange;
sending the first amount of cryptocurrency to the second exchange;

selling the first quantity of cryptocurrency at the second exchange;

withdrawing proceeds from a sale of the first quantity of cryptocurrency;

funding a receive transaction with the proceeds from the sale of the first quantity of cryptocurrency; and providing funds to a receiving party.

2. The method of claim 1, wherein the analyzing the stored volatility data includes analyzing transaction demand trends corresponding to one or more money transfer corridors.

3. The method of claim 1, wherein the crawling includes identifying information comprising at least one of: trading volumes, cryptocurrencies available for purchase and sale, new feeds, press releases, current market prices for cryptocurrencies available for purchase and sale, and fiat currencies that may be used when withdrawing funds from an account with a cryptocurrency exchange.

4. The method of claim 1, further comprising parsing news feeds and press releases to identify information to indicate new cryptocurrency exchanges to be included in the plurality of cryptocurrency exchanges.

5. The method of claim 1, further comprising parsing news feeds and press releases to identify information to indicate new cryptocurrencies to be listed in a particular cryptocurrency exchange of the plurality of cryptocurrency exchanges.

6. The method of claim 1, further comprising parsing news feeds and press releases to identify information that may indicate one or more cryptocurrencies from the plurality of cryptocurrencies that will be de-listed from a particular cryptocurrency exchange.

7. The method of claim 1, wherein the monitoring further comprises periodically executing probing transactions in each cryptocurrency exchange in the plurality of cryptocurrency exchanges.

8. The method of claim 7, wherein the probing transactions includes executing a purchase and/or sale of one or more cryptocurrencies at a cryptocurrency exchange to analyze transaction times for different cryptocurrencies and/or different exchanges.

9. The method of claim 1, further comprising selecting cryptocurrency exchanges for inclusion in the plurality of cryptocurrency exchanges if the cryptocurrency exchange that has a trading volume equal to or above a minimum trading volume criteria.

\* \* \* \* \*